US012634515B2

(12) United States Patent
Solovyev et al.

(10) Patent No.: US 12,634,515 B2
(45) Date of Patent: May 19, 2026

(54) SWITCHABLE DENSE MOTION VECTOR FIELD INTERPOLATION

(71) Applicants:HUAWEI TECHNOLOGIES CO., LTD., Shenzhen (CN); Friedrich-Alexander-Universität Erlangen-Nürnberg, Erlangen (DE)

(72) Inventors: Timofey Mikhailovich Solovyev, Munich (DE); Fabian Brand, Erlangen (DE); Jürgen Seiler, Erlangen (DE); Andre Kaup, Erlangen (DE); Elena Alexandrovna Alshina, Munich (DE)

(73) Assignees: Huawei Technologies Co., Ltd., Shenzhen (CN); Friedrich-Alexander-Universität Erlangen-Nürnberg, Erlangen (DE)

( * ) Notice: Subject to any disclaimer, the term of this patent is extended or adjusted under 35 U.S.C. 154(b) by 219 days.

(21) Appl. No.: 18/446,265

(22) Filed: Aug. 8, 2023

(65) Prior Publication Data

US 2024/0048756 A1     Feb. 8, 2024

Related U.S. Application Data

(63) Continuation of application No. PCT/RU2021/000053, filed on Feb. 8, 2021.

(51) Int. Cl.
  *H04N 19/513* (2014.01)
  *H04N 19/543* (2014.01)
(52) U.S. Cl.
  CPC ......... *H04N 19/521* (2014.11); *H04N 19/543* (2014.11)

(58) Field of Classification Search
  CPC ........ G06V 40/19; H04N 23/45; H04N 23/55; H04N 7/181; H04N 23/00; H04N 23/21; H04N 23/58; H04N 23/64; H04N 23/60; H04N 23/611; H04N 23/633; H04N 23/90; G03B 17/17; G03B 19/22; G03B 15/00
  See application file for complete search history.

(56) References Cited

U.S. PATENT DOCUMENTS

2005/0144540 A1* 6/2005 Fujishiro ............... G06T 3/4007
                                              714/48
2006/0294171 A1   12/2006 Bossen et al.
                        (Continued)

FOREIGN PATENT DOCUMENTS

EP      0940041 B1    11/2006
JP    2004164298 A  *  6/2004

OTHER PUBLICATIONS

Rufenacht (NPL, "A Triangulation Based Backward Adaptive Motion Field Subsampling Scheme," IEEE 2020) (Year: 2020).*
                        (Continued)

*Primary Examiner* — Shadan E Haghani
(74) *Attorney, Agent, or Firm* — Leydig, Voit & Mayer, Ltd.

(57) ABSTRACT

A sparse motion field exchanges motion information between encoder and decoder. Side information indicates a suitable interpolation approach for interpolating the motion vectors of the dense motion field different from the signaled sparse motion field motion vectors. The side information is provided on a segment basis. The segments are derived at the encoder side and the decoder side similarly, based on the reference images and the sparse motion field.

17 Claims, 14 Drawing Sheets

(56)　　　　　　References Cited

U.S. PATENT DOCUMENTS

| | | | | |
|---|---|---|---|---|
| 2012/0189208 A1* | 7/2012 | Inaba | ........................ | G06T 5/73 |
| | | | | 382/195 |
| 2012/0243611 A1* | 9/2012 | Kondo | ................. | H04N 19/132 |
| | | | | 375/E7.193 |
| 2017/0064325 A1 | 3/2017 | Lim et al. | | |
| 2019/0124337 A1* | 4/2019 | Ruefenacht | ............ | H04N 19/56 |
| 2023/0223975 A1* | 7/2023 | Higuera | .............. | H04M 1/0214 |
| | | | | 455/575.8 |

OTHER PUBLICATIONS

Yi Xiao et al: "Facial Feature Location with Delaunay Triangulation/ Voronoi Diagram Calculation", Australian Computer Society, Inc., Pan-Sydney Area Workshop on Visual Information Processing, pp. 103-108, Sydney, Australia, May 1, 2001 (May 1, 2001), XP058205578.

Brand Fabian et al: "A Triangulation-Based Backward Adaptive Motion Field Subsampling Scheme", 2020 IEEE 22nd International Workshop on Multimedia Signal Processing (MMSP), pp. 1-6, Sep. 21, 2020 (Sep. 21, 2020), XP55847150.

Weigand et al., "Joint Video Experts Team of ITU-T SG 16 WP 3 and ISO/IEC JTC 1/SC 29/WG11, Overview of the H.264/AVC video coding standard", IEEE Transactions on Circuits and Systems for Video Technology, vol. 13, No. 7, Total 19 pages (Jul. 2003).

Sullivan et al., "Overview of the high efficiency video coding (HEVC) standard," IEEE Transactions on Circuits and Systems for Video Technology, vol. 22, No. 12, Total 20 pages (Dec. 2012).

Bross et al., "Joint Video Experts Team of ITU-T SG 16 WP 3 and ISO/IEC JTC 1/SC 29/WG11, Versatile video coding (Draft 6)," JVET-O2001-vE, 15th Meeting of the Joint Video Exploration Team (JVET), Total 455 pages (Jul. 2019).

Han et al., "Video compression with dense motion fields," IEEE Transactions on Image Processing, vol. 10, No. 11, Total 8 pages (Nov. 2001).

Lanz et al., "Graph-based compensated wavelet lifting for scalable lossless coding of dynamic medical data," IEEE Transactions on Image Processing, vol. 29, No. 1, Total 13 pages (Dec. 2020).

Lu et al., "DVC: An End-to-end Deep Video Compression Framework," 2019 IEEE/CVF Conference on Computer Vision and Pattern Recognition (CVPR), arXiv preprint arXiv: 1812.00101v3, Total 14 pages (Apr. 2019).

Ladune et al., "Optical Flow and Mode Selection for Learning-based Video Coding," 2020 IEEE 22nd International Workshop on Multimedia Signal Processing (MMSP), arXiv:2008.02580v1, Total 6 pages (Aug. 2020).

"NumPy," https://numpy.org/, Total 5 pages (Aug. 2024).

He et al., "Guided Image Filtering," European Conference on Computer Vision, Total 14 pages (Sep. 2010).

O'neill, "PCG: A Family of Simple Fast Space-Efficient Statistically Good Algorithms for Random Number Generation," Harvey Mudd College, HMC-CS-2014-0905, Total 58 pages (Sep. 2014).

Thomson, "A Modified Congruence Method of Generating Pseudo-random Numbers," The Computer Journal, Total 1 page (Jan. 1958).

Matsumoto, "MersenneTwister: A 623-dimensionally Equidistributed Uniform Pseudo-Random Number Generator," ACM Transactions on Modeling and Computer Simulation, vol. 8, No. 1, Total 28 pages (Jan. 1998).

Widynski, "Middle Square Weyl Sequence RNG," arXiv:1704. 00358v5, Total 14 pages (May 2020).

"ISO/IEC 23094-1: Information technology—General video coding—Part 1: Essential video coding," Total 353 pages (Oct. 2020).

Chen, "Algorithm description for versatile video coding and test model 6 (VTM 6)," Joint Video Experts Team of ITU-T SG 16 WP 3 and ISO/IEC JTC 1/SC 29/WG11, JVET-O2002-v2, 15th Meeting of the Joint Video Exploration Team (JVET), Total 87 pages (Jul. 2019).

Demaret et al., "Image compression by linear splines over adaptive triangulations," Signal Processing, vol. 86, No. 7, Elsevier Computer Science, Total 13 pages (Jul. 2006).

Agranovsky et al., "Subsampling based compression and flow visualization," Proceedings of SPIE—The International Society for Optical Engineering 9397, total 16 pages (Feb. 2015).

Liu et al., "Neural Video Compression Using Spatio-Temporal Priors," IEEE, arXiv:1902.07383v2, Total 5 pages (Feb. 2019).

* cited by examiner

Reference Frame                    Current Frame $$t = t_0 - 1 \qquad\qquad t = t_0$$

Forward Motion

Origin Image                    Destination Image
Reference Image                 Current Image Backward Motion Destination Image               Origin Image
Reference Image                 Current Image

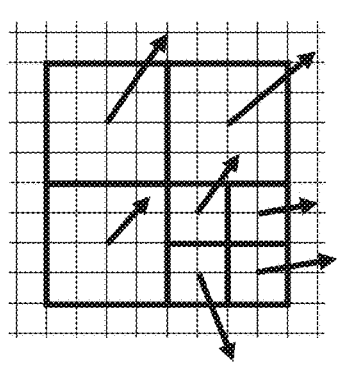
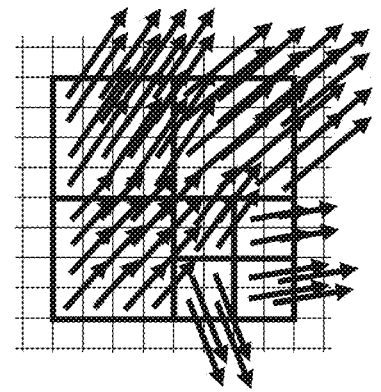
Fig. 2A
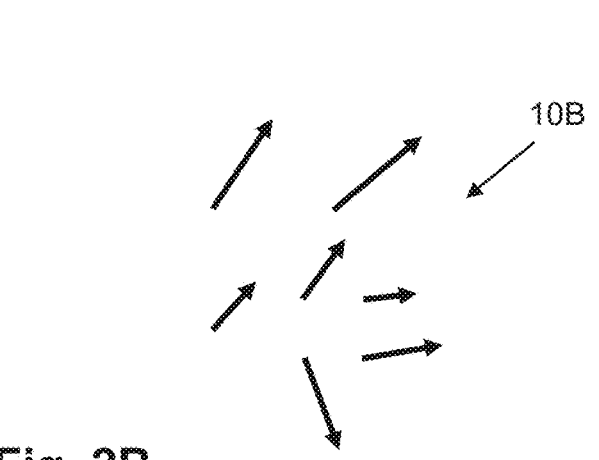
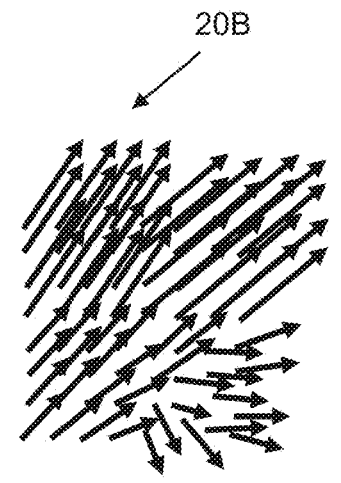
Fig. 2B
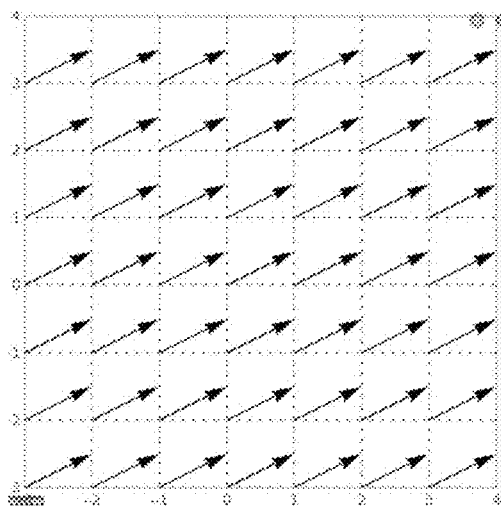
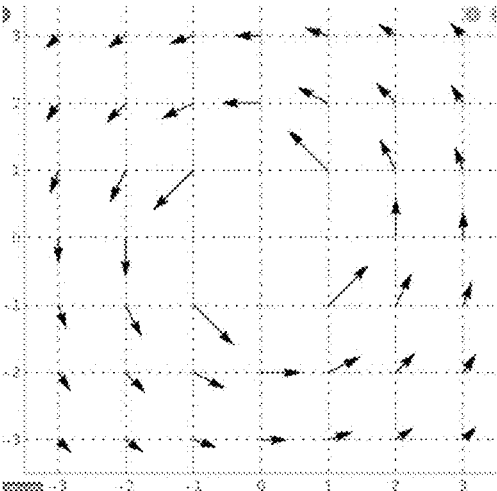
Fig. 2C

Fig. 8A      Fig. 8B      Fig. 8C

SWITCHABLE DENSE MOTION VECTOR FIELD INTERPOLATION

CROSS-REFERENCE TO RELATED APPLICATIONS

This application is a continuation of International Application No. PCT/RU2021/000053, filed on Feb. 8, 2021, the disclosure of which is hereby incorporated by reference in its entirety.

The present disclosure relates to methods and apparatuses for video encoding and decoding applying motion compensation.

BACKGROUND

Video encoders usually apply motion estimation and compensation for inter-frame prediction to exploit temporal redundancy. The motion vectors describe how the pixels of a reference frame have to be shifted in order to obtain a prediction for the pixels of a current frame. This is typically performed in a block-based manner, which assigns the same motion vector to each pixel of a block.

FIG. 1A illustrates such prediction of the current frame at the time point t. A current block 10 in the current frame is predicted by a prediction block 12 of the reference frame at a time point t−1, which is on a position that differs from the position of a co-located block 11. The co-located block 11 is a block with a location within the reference frame being the same as the location of the current block within the current frame. The arrow representing movement from the location of the co-located block to the location of the prediction block 12 is the motion vector. The motion vector may be conveyed from the encoder to the decoder as side information.

FIG. 1B illustrates forward motion and backward motion. The forward motion is the motion of all pixels from a reference image, which precedes the current image in the displaying order, to the current image. The backward motion is the motion of all pixels from a reference image, which follows the current image in the displaying order, to the current image. In case of backward motion estimation, the encoding and decoding order do not correspond to the displaying order.

In order to make a block-based prediction scalable, hierarchic block splitting has been typically applied, as shown in FIG. 2A. In FIG. 2A, a raster of pixels (samples) is shown alongside with a block of 8×8 samples split into three 4×4 sub-blocks and four 2×2 sub-blocks. For each sub-block, a motion estimation is performed and a respective motion vector is obtained as illustrated by the corresponding arrows indicating direction of the movement with respect to the reference frame. The motion vectors are typically signaled within the bitstream of the encoded video; either directly or encoded differentially. In some codecs, implicit derivation of the motion vectors is applied, the derivation being performed based on the reconstructed decoded image on both encoder side and decoder side.

By hierarchic block splitting, video codecs perform implicit sub-sampling by using block-based motion estimation and compensation. Modern codecs like high-efficiency video coding (HEVC) or versatile video coding (VVC), in a way, use content adaptive sampling by using different block sizes. These codecs explicitly signal the block splits as a quad-tree and ternary tree. It is established, that the increasingly adaptive splitting is responsible for large gains in coding efficiency of the respective codecs.

However, these procedures are often inaccurate and produce blocking artifacts, as long as the number of motion vectors to be transmitted is small.

SUMMARY

The present disclosure relates to methods and apparatuses for providing motion vectors.

In particular, embodiments of the present disclosure provide an efficient way of reconstructing motion vectors including employing of at least two different motion vector interpolation methods selected on a picture segment basis.

According to an embodiment, a method is provided for reconstructing a motion vector field for a picture comprising a plurality of samples, the method comprising: obtaining, based on a bitstream, two or more motion vectors, each of the two or more motion vectors specifying motion for a sample out of a first subset of the plurality of samples; deriving a plurality of interpolation segments based on the obtained two or more motion vectors and one or more reference pictures to which the two or more motion vectors are related; obtaining, from the bitstream, motion interpolation information indicating, for each of the plurality of interpolation segments, an interpolation approach for reconstructing motion in the segment; and for samples of an interpolation segment, reconstruct the motion vector field by applying the interpolation approach indicated by the motion interpolation information for the segment and using at least one of the two or more motion vectors.

Such derivation of segments for interpolation information does not require additional signaling and may provide improvement of motion field reconstruction.

For example, the motion interpolation information indicates, for each of the plurality of interpolation segments, an interpolation approach out of at least two predefined interpolation approaches.

Selection from a predefined set enables an efficient signaling of the interpolation method, with limited number of bits.

In particular, the motion interpolation information is a binary flag indicating, for each of the plurality of interpolation segments, an interpolation approach out of a first interpolation approach and a second interpolation approach.

One-bit signaling by means of a flag does not add much rate, while a selection of an interpolation method may improve the reconstruction quality.

For instance, the at least two predefined interpolation approaches differ between each other and include, for example, nearest neighbor interpolation, bilinear interpolation, windowed sinc function based interpolation, and polynomial interpolation.

Provision of interpolation methods with different quality and complexity enables content adaptive interpolation selection. Usage of the proper interpolation method allows representing a motion model within a particular area more precisely, which results in better prediction signal quality.

In an exemplary implementation, the deriving of the plurality of interpolation segments comprises: reconstructing a first motion field by applying the first interpolation approach on the two or more motion vectors; reconstructing a second motion field by applying the second interpolation approach on the two or more motion vectors; reconstructing a first intermediate picture using motion compensation with the first motion field; reconstructing a second intermediate picture using motion compensation with the second motion field; determine centers of the plurality of interpolation segments according to a first predetermined rule at least in areas of the picture for which the first intermediate picture and the second intermediate picture differ; and for each of the determined segment centers, determine samples of the picture which belong to the segment based on a second rule.

Determining segments in this way is possible at the encoder in the same way as at the decoder, so that no additional signaling is required. The determination based on differences between the pictures interpolated by different interpolation methods may be very efficient as it focuses on portions of the motion field for which the different interpolation lead to very different results.

For example, the degree of difference between the first intermediate picture and the second intermediate picture is calculated sample-wise based on a dissimilarity measure.

Difference measures performed sample-wise enable for accurate determination of the segments.

In particular, for instance, the determining of centers of the plurality of interpolation segments is performed according to the first predetermined rule in areas of the picture for which the first intermediate picture and the second intermediate picture differ by more than a predefined amount.

Further computational complexity may be saved by performing segmentation only on portion with some non-zero or not negligible difference. It is noted that the term "predefined" may correspond to a fixed setting, such as setting by standard to differ by any value larger than zero or larger than some other non-zero value. However, in some embodiments, the encoder may define such threshold and indicate it within the bitstream, or the threshold may be set in accordance with another one or more coding parameters such as quantization value, bit depth or the like. The encoder may predefine the value based on some user settings and/or based on some cost function such as a rate, distortion and/or complexity function.

In an exemplary implementation, the first predetermined rule specifies a non-uniform sampling of samples of the picture, in which samples to be segment centers are picked pseudo-randomly with a predetermined seed, wherein the probability of picking a sample is proportional to the absolute difference between the first intermediate picture and the second intermediate picture.

Non uniform sampling based on the difference and randomization provides for a good guess of segment centers. Randomization allows avoiding negative effects of the segment centers absence in areas with a relatively small absolute difference between the first intermediate picture and the second intermediate picture.

In an exemplary implementation, the first predetermined rule includes: generating pseudo-random noise samples and obtain a noised difference picture by multiplying the pseudo-random samples with the respective samples of a difference picture obtained as a difference between the first intermediate picture and the second intermediate picture; and selecting, as centers of the plurality of interpolation segments, samples of the noised difference picture which exceed a pre-determined threshold.

This alternative randomization of differences and then selecting centers enables for parallel processing and also provides for a good guess of segment centers.

For example, for each of the determined interpolation segment centers, the samples of the picture which belong to the segment are determined as Voronoi regions in a difference picture obtained as a difference between the first intermediate picture and the second intermediate picture; and the Voronoi regions are determined separately for areas of the difference picture with a positive sign and for areas of the difference picture with a negative sign.

Voronoi regions are an efficient means for segment construction, leading to possibly spacious segments.

For example, no centers of the plurality of interpolation segments are determined in areas of the picture for which the first intermediate picture and the second intermediate picture meet a similarity criterion.

This enables saving some computational complexity. There may be a default approach to an interpolation of such areas. Also such an approach allows to reduce the bitstream size, as supplementary information for such areas, considered as unimportant, is not signaled.

Alternatively or in addition to the above mentioned examples and implementations, the motion interpolation information includes for each of the plurality of interpolation segments a piece of motion interpolation information; the association of pieces of the motion interpolation information with each respective interpolation segment out of the plurality of interpolation segments is given by: ordering of the pieces of the motion interpolation information in the bitstream syntax; and a predetermined ordering of the determined plurality of interpolation segments.

Such association avoids additional signaling to demap the interpolation information properly at the decoder. Signaling additional piece of motion information for each of the plurality of interpolation segments allows to describe motion model for the particular areas more precisely and thus improve prediction signal quality.

Alternatively or in addition to the above mentioned examples and implementations, the method further comprises: determining for each sample of the picture an interpolation approach according to the segment in which the sample is located, thereby obtaining a mask picture indicating in each mask picture sample the interpolation approach; assigning to the mask picture samples that belong to no segment a default interpolation approach; and determining for each sample of the picture a motion vector by applying the interpolation approach specified by the corresponding sample of the mask picture.

In this way, an interpolation method may be reconstructed and provided for each picture sample, which allows for further processing of such a mask, e.g. considering the 2D spatial relation between the picture points.

For example, the method may be further comprising a step of smoothing the mask picture before determining the motion vectors.

Smoothing the mask may further improve the interpolation results and the results of the picture reconstruction, e.g. by weighting the reconstructed candidate pictures by the weights of the smoothing filter. This feature is useful when residual coding is used, because for the most of known residual coding methods presence of the sharp edges in the residual signal cause significant bitrate increase, which in turn make the whole compression inefficient even if prediction signal quality is improved by the method.

For example, the smoothing is performed by Gaussian filtering or guided image filtering.

These filters may perform well especially in context if motion picture reconstruction. Gaussian filtering have relatively low complexity, whereas guided image filtering provide smoothing which is better in terms of compression efficiency. An additional benefit of the guided image filtering is that its parameters are more stable in comparison with Gaussian filter's parameters in scenario when a residual coding is performed.

According to an embodiment, a method is provided for encoding a motion vector field for a picture comprising a plurality of samples, the method comprising: including, into a bitstream, two or more motion vectors, each of the two or more motion vectors specifying motion for a sample out of a first subset of the plurality of samples; deriving a plurality of interpolation segments based on the two or more motion vectors and one or more reference pictures to which the two or more motion vectors are related; encoding, into the bitstream, motion interpolation information indicating, for each of the plurality of interpolation segments, an interpolation approach for reconstructing motion in the segment; and for samples of an interpolation segment, determine the motion vector field by applying the interpolation approach indicated by the motion interpolation information for the segment and using at least one of the two or more motion vectors.

Such encoding does not require conveying any segment information and enables a more accurate reconstruction by providing interpolation information.

In an exemplary implementation, the method is further comprising a step of determining the two or more motion vectors by sparsification of a motion field by applying Delauney (also referred to as Delone) triangulation.

Sparsification by Delauney triangulation may be advantageous as it does not require signaling the origin points of the motion vectors and may still adapt better to the content than rectangular partitions for some contents.

Alternatively or in addition, the method is further comprising a step of selecting the interpolation approach for each of the plurality of interpolation segments according to a cost function including one or more out of rate, distortion and complexity.

Rate, distortion and/or complexity optimization enables to take into account application or user preferences.

For example, the motion interpolation information indicates, for each of the plurality of interpolation segments, an interpolation approach out of at least two predefined interpolation approaches.

Selection from a predefined set enables an efficient signaling of the interpolation method, with limited number of bits.

For example, the motion interpolation information is a binary flag indicating, for each of the plurality of interpolation segments, an interpolation approach out of a first interpolation approach and a second interpolation approach.

One-bit signaling by means of a flag does not add much rate, while a selection of an interpolation method may improve the reconstruction quality.

For example, the at least two predefined interpolation approaches differ between each other and include nearest neighbor interpolation, bilinear interpolation, windowed sinc function based interpolation, and polynomial interpolation.

Provision of interpolation methods with different quality and complexity enables a content adaptive interpolation selection. Usage of the proper interpolation method allows representing a motion model within a particular area more precisely, which results in a better prediction signal quality.

According to an exemplary implementation, the deriving of the plurality of interpolation segments comprises: reconstructing a first motion field by applying the first interpolation approach on the two or more motion vectors; reconstructing a second motion field by applying the second interpolation approach on the two or more motion vectors; reconstructing a first intermediate picture using motion compensation with the first motion field; reconstructing a second intermediate picture using motion compensation with the second motion field; determine centers of the plurality of interpolation segments according to a first predetermined rule at least in areas of the picture for which the first intermediate picture and the second intermediate picture differ; and for each of the determined segment centers, determine samples of the picture which belong to the segment based on a second rule.

Determining segments in this way is possible at the encoder in the same way as at the decoder, so that no additional signaling is required. The determination based on differences between the pictures interpolated by different interpolation methods may be very efficient as it focuses on portions of the motion field for which the different interpolation lead to very different results.

For example, the degree of difference between the first intermediate picture and the second intermediate picture is calculated sample-wise based on a dissimilarity measure.

Difference measures performed sample-wise enable for accurate determination of the segments.

For example, the determining of centers of the plurality of interpolation segments is performed according to the first predetermined rule in areas of the picture for which the first intermediate picture and the second intermediate picture differ by more than a predefined amount.

Further computational complexity may be saved by performing segmentation only on portion with some non-zero or not negligible difference.

For example, the first predetermined rule specifies a non-uniform sampling of samples of the picture, in which samples to be segment centers are picked pseudo-randomly with a predetermined seed, wherein the probability of picking a sample is proportional to the absolute difference between the first intermediate picture and the second intermediate picture.

Non uniform sampling based on the difference and randomized provides for a good guess of segment centers. Randomization allows avoiding negative effect of the segment centers absence in areas with a relatively small absolute difference between the first intermediate picture and the second intermediate picture.

According to an exemplary implementation, wherein the first predetermined rule includes: generating pseudo-random noise samples and obtain a noised difference picture by multiplying the pseudo-random samples with the respective samples of a difference picture obtained as a difference between the first intermediate picture and the second intermediate picture; and selecting, as centers of the plurality of interpolation segments, samples of the noised difference picture which exceed a pre-determined threshold.

This alternative randomization of differences and then selecting centers enables for parallel processing and also provides for a good guess of segment centers.

In some exemplary implementations, for each of the determined interpolation segment centers, the samples of the picture which belong to the segment are determined as Voronoi regions in a difference picture obtained as a difference between the first intermediate picture and the second intermediate picture; and the Voronoi regions are determined separately for areas of the difference picture with a positive sign and for areas of the difference picture with a negative sign.

Voronoi regions are an efficient means for segment construction, leading to possibly spacious segments.

For example, no centers of the plurality of interpolation segments are determined in areas of the picture for which the first intermediate picture and the second intermediate picture meet a similarity criterion.

This enable saving some computational complexity. There may be a default approach to interpolation of such areas. Also such approach allows to reduce the bitstream size, as supplementary information for such areas, considered as unimportant, is not signaled.

In some exemplary implementations, the motion interpolation information includes for each of the plurality of interpolation segments a piece of motion interpolation information; the association of pieces of the motion interpolation information with each respective interpolation segment out of the plurality of interpolation segments is given by: ordering of the pieces of the motion interpolation information in the bitstream syntax; and a predetermined ordering of the determined plurality of interpolation segments.

Such association avoids additional signaling to demap the interpolation information properly at the decoder. Signaling additional piece of motion information for each of the plurality of interpolation segments allows to describe motion model for the particular areas more precisely and thus improve prediction signal quality.

In some exemplary implementations, the method is further comprising the steps of determining for each sample of the picture an interpolation approach according to the segment in which the sample is located, thereby obtaining a mask picture indicating in each mask picture sample the interpolation approach; assigning to the mask picture samples that belong to no segment a default interpolation approach; and determining for each sample of the picture a motion vector by applying the interpolation approach specified by the corresponding sample of the mask picture.

In this way, interpolation method for each picture sample may be reconstructed.

For instance, the method may be further comprising a step of smoothing the mask picture before determining the motion vectors.

Smoothing the mask may further improve the interpolation results and the results of the picture reconstruction, e.g. by weighting the reconstructed candidate pictures by the weights of the smoothing filter. This feature is useful when residual coding is used, because for the most of known residual coding methods presence of the sharp edges in the residual signal cause significant bitrate increase, which in turn make the whole compression inefficient even if prediction signal quality is improved by the method.

For example, the smoothing is performed by Gaussian filtering or guided image filtering.

These filters may perform well especially in context if motion picture reconstruction. Gaussian filtering have relatively low complexity, whereas guided image filtering provide smoothing which is better in terms of compression efficiency. An additional benefit of the guided image filtering is that it's parameters are more stable in comparison with Gaussian filter's parameters in scenario when a residual coding is performed.

According to an embodiment, a computer program is provided which is stored on a non-transitory computer readable medium, the computer program including instructions, which, when executed on one or more processors, perform the steps of any of the methods mentioned above.

According to an aspect, an apparatus is provided for reconstructing a motion vector field for a picture comprising a plurality of samples, the apparatus comprising a processing circuitry configured to: obtain, based on a bitstream, two or more motion vectors, each of the two or more motion vectors specifying motion for a sample out of a first subset of the plurality of samples; derive a plurality of interpolation segments based on the obtained two or more motion vectors and one or more reference pictures to which the two or more motion vectors are related; obtain, from the bitstream, motion interpolation information indicating, for each of the plurality of interpolation segments, an interpolation approach for reconstructing motion in the segment; and for samples of an interpolation segment, reconstruct the motion vector field by applying the interpolation approach indicated by the motion interpolation information for the segment and using at least one of the two or more motion vectors.

According to an aspect, an apparatus is provided for encoding a motion vector field for a picture comprising a plurality of samples, the apparatus comprising a processing circuitry configured to: include, into a bitstream, two or more motion vectors, each of the two or more motion vectors specifying motion for a sample out of a first subset of the plurality of samples; derive a plurality of interpolation segments based on the two or more motion vectors and one or more reference pictures to which the two or more motion vectors are related; encode, into the bitstream, motion interpolation information indicating, for each of the plurality of interpolation segments, an interpolation approach for reconstructing motion in the segment; and for samples of an interpolation segment, determine the motion vector field by applying the interpolation approach indicated by the motion interpolation information for the segment and using at least one of the two or more motion vectors.

The apparatuses and programs share the same advantages as the above described corresponding methods. The above described exemplary implementations and embodiments relating to the methods also apply to the functionality of the apparatuses.

Moreover, methods corresponding to the steps performed by the processing circuitry as described above, are also provided.

According to an aspect, a computer-readable medium is provided storing a program code for performing the method mentioned above. In particular, the program code includes instructions which when executed on one or more processors perform the steps on the method.

According to an aspect, an apparatus is provided with a processing circuitry configured to performed any of the methods above. Still further, any of the above motion vector encoding methods may be performed as a part of video encoding. Still further, any of the above motion vector decoding methods may be performed as a part of video decoding. Correspondingly, the above apparatuses for encoding and decoding motion vectors may be part of the respective apparatuses for encoding and decoding of video.

The above mentioned apparatuses may be embodied on an integrated chip.

Any of the above mentioned embodiments and exemplary implementations may be combined.

BRIEF DESCRIPTION OF THE DRAWINGS

In the following exemplary embodiments of the present disclosure are described in more detail with reference to the attached figures and drawings, in which

FIG. 2A is a schematic drawing illustrating motion estimation in a hierarchically split block;

FIG. 2B is a schematic drawing illustrating motion vector reconstruction applying interpolation;

FIG. 2C is a schematic drawing illustrating a translational movement and a rotational movement;

FIGS. 8A-C are drawings illustrating some intermediate results (difference image, non-uniformly sampled centers, and centers obtained by weighted noise thresholding) of methods according to the exemplary implementation employing random sampling;

FIG. 11A) shows the difference image, FIG. 11B) shows segments obtained by sign specific Voronoi segmentation based on centers provided by the non-uniform sampling, and FIG. 11C) shows segments obtained by sign specific Voronoi segmentation based on centers provided by the weighted noise thresholding;

DETAILED DESCRIPTION

Figure 1A:
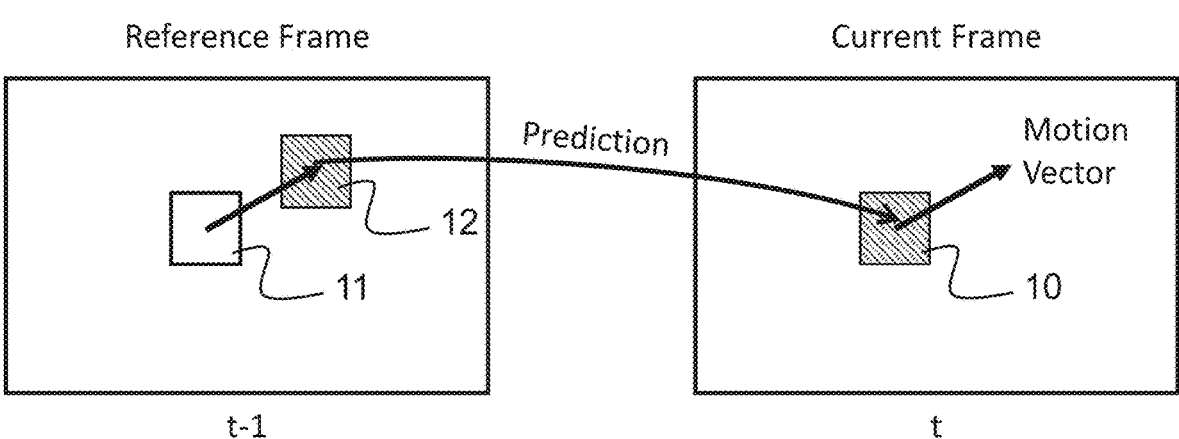
FIG. 1A is a schematic drawing illustrating motion estimation and motion prediction.
Figure 1B:
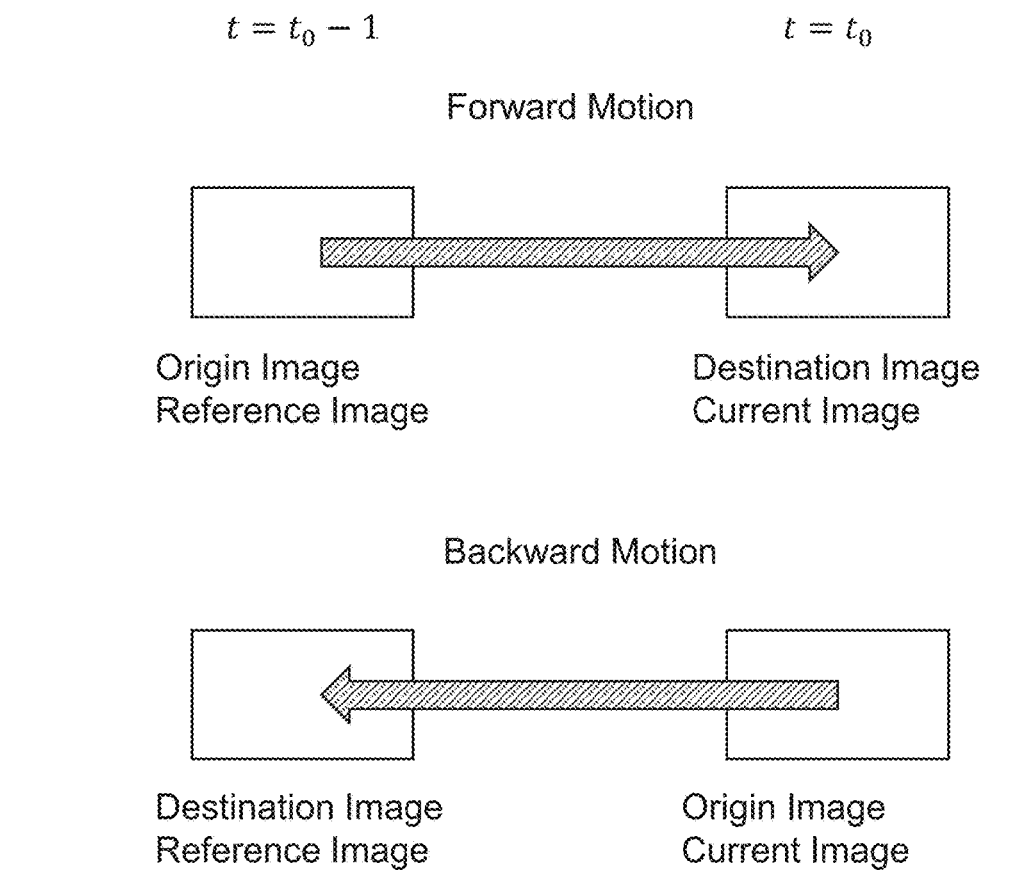
FIG. 1B is a schematic drawing illustrating forward and backward prediction.

In the following description, reference is made to the accompanying figures, which form part of the disclosure, and which show, by way of illustration, exemplary aspects of embodiments of the present disclosure or exemplary aspects in which embodiments of the present disclosure may be used. It is understood that embodiments of the present disclosure may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Many video codecs perform implicit sub-sampling by using block-based motion estimation and compensation as mentioned above with reference to FIG. 2A. Modern codecs like moving picture experts group (MPEG)-5/essential video coding (EVC) or H.266/VVC, in a way, use content adaptive sampling by using different block sizes. These codecs explicitly signal the block splits as a quad-tree and ternary tree. The same block structure is also used to signal different interpolation method. In the case of VVC, for example each block can either use the transmitted motion vector for all pixels (translational motion) or interpolate the motion on a 4×4 grid using motion vectors at its corner (affine motion). This has the disadvantage that block artifacts may occur already in the motion compensation and also in the final reconstructed image.

FIG. 2B shows a more flexible motion vector reconstruction. On the left hand side a similar sparse motion field is shown as in FIG. 2A. However, on the right hand side, the reconstructed motion field is smoother. This motion field reconstruction does not follow the rectangular block splitting. As will be described in the embodiments and examples below, FIG. 2B employs two (or more) different interpolation methods. It is not dependent on partitioning. Consequently, the motion field is smoother and may lead to a better picture reconstruction.

FIG. 2C shows some further typical interpolation methods for interpolating motion. On the left hand side, a replication of the motion vectors is shown (nearest neighbor interpolation), which may perform well for translation motion, but may be weaker for more complex motion types. On the right hand side, sample-level interpolation of motion vectors is shown, which may behave better for more complex motions, here a circular motion (rotation). An image may have many different motion types, and thus, a single motion model may rarely be optimal for the entire picture.

Non-block-based motion compensation is supported only in a few modern video codecs. For example in MPEG-5/EVC pixel-base motion compensation was introduced for affine motion model and uses an Enhanced Interpolation Filter. Motion field is reconstructed on pixel basis, but switching between regular translational and affine motion model is still performed on a block basis, so that the same motion model parameters are used for the whole block. The main reason is that the whole motion field has to be transmitted (included into the bitstream). In some approaches, dense motion field is used to construct a hierarchical tree which is pruned to be content adaptive. In such approach, the tree itself also has to be transmitted, while the motion information itself can be transmitted more efficiently. However, the resulting motion field may contain a block structure even though it was derived from a dense motion field.

In the following, some of the used technical terms are explained. A motion vector is typically understood as a 2D-vector that specifies the spatial distance between two corresponding points in two different video frames, usually denoted as $v=[v_x, v_y]$. An MV is commonly used abbreviation for motion vector. However, the term "motion vector" may have more dimensions. For example, a reference picture may be an additional (temporal) coordinate. The term "MV coordinate" or "MV position" denotes a position of a pixel (of which the motion is given by the motion vector) or motion vector origin. Denoted as $p=[x, y]$. A motion field is a set of $\{p,v\}$ pairs. It may be denoted as M or abbreviated as MF. A dense motion field is a motion field, which covers every pixel of an image. Here, p may be redundant, if the dimensions of the image are known, since the motion vectors can be ordered in line-scan order or in any predefined order. A sparse motion field is a motion field that does not cover all pixels. Here, knowing p may be necessary in some scenarios. A reconstructed motion field is a dense motion field, which was reconstructed from a sparse motion field. The term current frame denotes a frame to be encoded, e.g. a frame which is currently predicted in case of the inter prediction. A reference frame is a frame that is used as a reference for temporal prediction.

Motion compensation is a term referring to generating a predicted image using a reference frame and motion information (e.g. a dense motion field may be reconstructed and applied for that). Inter-Prediction is a temporal prediction in video coding in which motion information is signaled to the decoder such that it can generate a predicted image using previously decoded one or more frames. The term frame denotes in video coding a video picture (which may be also referred to as image). A video picture includes typically a plurality of samples (which are also referred to as pixels) representing a brightness level. A frame (picture) has typically a rectangular shape and it may have one or more channels such as color channels and/or other channels (e.g. depth).

Some newer optical flow based algorithms generate a dense motion field. This motion field consists of many motion vectors, one for each pixel in the image. Using this motion field for prediction usually yields a much better prediction quality than hierarchic block-based prediction. However, since the dense motion field contains as many motion vectors as the image has samples (e.g. pixels), it is not feasible to transmit (or store) the whole field, since the motion field may contain more information than the image itself. Therefore, the dense motion field would usually be sub-sampled, quantized, and then inserted (encoded) into the bitstream. The decoder then interpolates the missing (due to subsampling) motion vectors and uses the reconstructed dense motion field for motion compensation. The reconstruction of the (dense) optical flow means reconstructing motion vectors for sample positions within the image, which do not belong to the set of sample positions associated with motion vectors indicated in the bitstream, based on the sample positions of the set.

In the sub-sampling process, there are the following possibilities.

The field can be sub-sampled in a regular pattern, which is independent of the content. A regular sampling pattern is a grid pattern with regularly spaced distances. Since the number of pixels might not be an integer multiple of the number of sampling points per line, the distances between the sampling points may vary by one pixel. This may result in many sampling points, which are placed at suboptimal positions. Areas with uniform motion, where only few motion vectors are needed, contain the same number of motion vectors per unit area as areas with diverse motion, where many sampling points are needed. The former results in a bit rate which is larger than necessary, the latter in an insufficient prediction quality since more motion vectors are needed. Such subsampling is similar in result to the block-based motion vector estimation and compensation applied in the current codecs such as HEVC and VVC.

Another possibility is to transmit the motion vectors corresponding only to those positions, which are needed for a good (e.g. in terms of desired quality and/or rate) reconstruction of the flow field. That way, areas with uniform motion do not need much rate and areas with complex motion are sampled sufficiently dense. However, since only the encoder knows the whole motion field, the positions (of the motion vectors) have to be signaled in some way in the bitstream. Signaling of the positions reduces the efficiency of the coding because it requires additional rate. In other words, as opposed to the sampling of the motion vector with a regular pattern, the motion field is sampled at positions that are not predefined, and the coordinates of the sampling positions need to be transmitted to decoder.

In the above description the term "rate", or equivalently bitrate relates to the information (in terms of bits or other units of information) that needs to be transmitted from encoder to decoder for reconstruction of video. Usually the more the side information necessary for reconstruction of a video, the higher the necessary bitrate.

PCT/EP2020/062062 (Triangulation-Based Adaptive Subsampling of Dense Motion Vector Fields, filed Apr. 30, 2020) provides an approach which may reduce disadvantages of both above-mentioned possibilities (regular sampling and content-based sampling). In particular, an encoder is able to transmit motion vectors mostly at those positions which are suitable for good reconstruction without having to transmit their positions explicitly. Furthermore, the motion field can be transmitted in a progressive and scalable way. This means, that the transmission can be stopped after any transmitted motion vector and the motion field can then be reconstructed with a lower quality (meaning with a lower resolution). The approach is based on triangulation. Moreover, PCT/RU2020/000302 (Motion Compensation With a Sparse Optical Flow Representation, filed Jun. 22, 2020) may provide for an exemplary motion compensation.

A dense motion field between two natural images contains areas with different significance of content, which may be sampled in different ways.

Areas with uniform motion only need very few sampling points, since the intermediate motion vectors can be interpolated easily. This is caused by the fact that most of the motion vectors have the same orientation and size.

Borders between two areas with uniform but different motion may be better to be sampled densely along the border line to assure the motion vector interpolation on both sides of the border is correct.

Areas with complex (e.g. non-affine) motion are desirable to be sampled densely.

The present disclosure may operate with any kind of subsampled motion field. It relates to reconstructing the sparse (sub-sampled) motion field to possibly improve the quality of picture reconstruction.

State-of-the-art optical flow algorithms generate a dense motion field. Using this motion field for prediction usually yields a much better prediction quality. However, since the dense motion field contains as many motion vectors as the image has pixels, it is not feasible to transmit the whole field, since the motion field contains more information than the image itself. Therefore, the dense motion field has to be sub-sampled, quantized, and encoded into the bitstream to be transmitted. The decoder then interpolates the missing motion vectors and uses the reconstructed dense motion field for motion compensation.

Some embodiments concern the interpolation of the motion vector field. Different characteristics of the motion field (different motion models) and the frame call for different interpolation methods. Some areas have translational motion, which for example should be interpolated by duplicating motion vectors, similar to nearest neighbor interpolation. Other areas have affine motion, which should be interpolated linearly from the surrounding motion vectors. However, the decoder does not directly know, which method is optimal at which position. Only the encoder can provide this information, so this information has to be transmitted over the channel (included into the bitstream). The encoder can determine the optimal interpolation method for each pixel. In the case of two methods, this is corresponds to 1 bit per pixel (bpp). Transmitting this information directly may still cause considerable overhead.

In an embodiment, this issue is solved by transmitting an (ideal) mask in a lossy way, using a smaller amount of side information (~0.01 bpp). To that end, a special segmentation of the motion field is performed and it is transmitted only per segment which method performs better. That way, large amounts of data may be reduced when selecting the appropriate interpolation.

The segments are derived in a way that can be reproduced using the information available on the decoder side, so no additional side information may be necessary. At the same time, the segments are suitable to transmit the ideal mask, meaning that the ideal mask is almost constant within one segment.

For that end, properties of a difference image (or another dissimilarity measure) are exploited between two candidate images, which are the result of motion compensation using only a single respective motion field interpolation method for the particular area. In areas, where the difference (dissimilarity) image is zero, both methods are equivalent, therefore no transmission (inclusion into the bitstream) of the supplementary motion information about the motion field interpolation method is necessary. For example, a default interpolation method may be used. For areas where there is only a small difference, not much bits need to be spent, a rough approximation is sufficient, while the rate is better used in areas with larger difference.

Here and in the following, a candidate motion field denotes a reconstructed motion field which is used in the switching process. A candidate image denotes an image obtained by warping the reference frame with a candidate motion field (performing motion compensation using the motion vectors of the candidate motion field). A switching mask is e.g. a mask of the same dimensionality as the image which contains pixel-wise information on which interpolation method is to be used. For two possible motion field interpolation methods the mask may be binary (one bit per pixel). It is noted that it is conceivable to provide masks not pixel-wise, but sub-samples, e.g. per a region (superpixel) of 2×2 pixel or the like. This may be beneficial in terms of encoder complexity reduction, for some implementations. In some exemplary embodiments, the method is performed in a down-sampled domain and then the resulted motion field is up-sampled back to the original resolution.

An ideal mask is a mask, which contains the information for each pixel, on which method minimized the error of that pixel. When referring to interpolation here, if not explicitly stated otherwise in the present disclosure, the term refers to the reconstruction of a dense motion field from a sparse one. It is noted that an interpolation may be used at different stages of the video coding, decoding, and/or processing. However, the present disclosure mainly discusses interpolation of the motion vectors.

Figure 3:
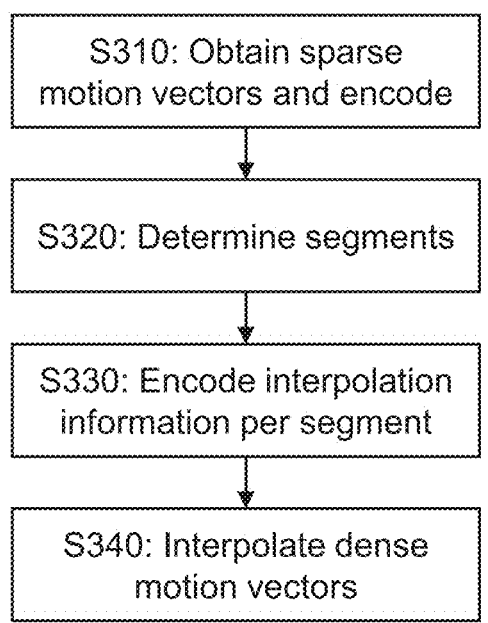
FIG. 3 is a flow diagram illustrating an exemplary embodiment of a method for encoder side.
Figure 4:
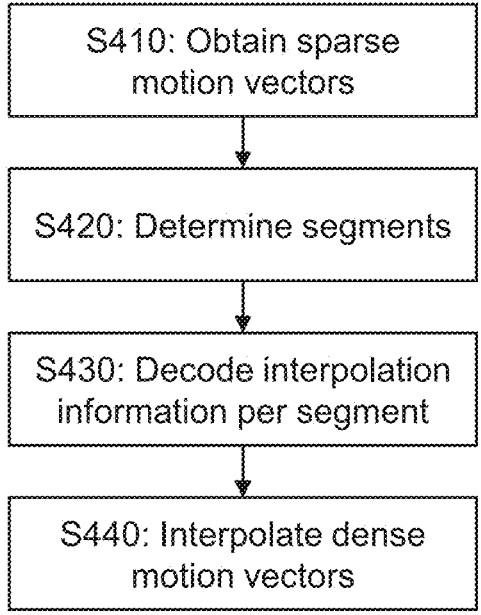
FIG. 4 is a flow diagram illustrating an exemplary embodiment of a method for decoder side.

FIGS. 3 and 4 show exemplary methods for encoding and decoding of motion vectors to or from the bitstream. In particular, according to an embodiment, a method is provided for encoding a motion vector field for a picture, as shown in FIG. 3.

As mentioned above, the picture includes one or more samples (pixels). The MV encoding method comprises a step of including S310, into a bitstream, two or more motion vectors 10B. Each of the two or more motion vectors 10B specifies motion for a sample out of a first subset of the plurality of samples. The first subset of samples thus corresponds to positions of the motion vectors. In other words, the samples of the first set are those for which the respective motion vectors are indicated in the bitstream.

The positions themselves (in the first set) may, but do not have to be included into the bitstream. As discussed above with reference to FIGS. 2A to 2C, it is possible to know the assignment between the signaled MVs and their positions. For example, the positions may be defined by a splitting known to the encoder and decoder (e.g. indicated in the bitstream or standardize), e.g. in case of fixed predefined block sizes (such as 16×16) or in case of hierarchic splitting indicated in the bitstream or the like. When the partitions obtained by the splitting are ordered according to a predetermined (scan) order (such as from left to right and from top to bottom, possibly in the hierarchic order), then the order of the MVs in the bitstream may be the same, so that assignment between the MVs and the positions of the first set is clear. The partition order and MV order does not have to be the same, it is sufficient, if there is a known mapping between them. The above mentioned triangulation approach may be used and also does not require signaling of the positions from the first set. Further partitioning approaches are possible and the present disclosure is not limited to any particular one. The MV positions do not have to be but may be indicated in the bitstream.

Step S310 may also include obtaining the plurality of motion vectors (e.g. sparse motion field, such as 10B). Such obtaining may correspond to sparsification of a dense motion field in some implementations. In other implementations, the obtaining may correspond to motion estimation. There are only examples, and the disclosure is not limited to any particular obtainment of the MVs.

The including S310 into the bitstream may be explicit, e.g. there may be bitstream syntax defining presence of a syntax element for each of the plurality of motion vectors. However, it is conceivable that the motion vectors are coded differentially, or using prediction, or a list of candidates, or derived from other parameters indicated in the bitstream, or the like. The motion vectors may be further encoded by applying an entropy code such as variable length code of any known kind or arithmetic coding. Both may be applied without or with exploiting context adaptivity.

The MV encoding method further includes a step S320 of deriving a plurality of interpolation segments based on the two or more motion vectors and one or more reference pictures to which the two or more motion vectors are related. Moreover, the method further includes a step S330 of encoding, into the bitstream, motion interpolation information indicating, for each of the plurality of interpolation segments, an interpolation approach for reconstructing motion in the segment.

For example, the reconstruction of motion in the segment may be reconstruction of the motion field 20B (such as dense motion field) from the motion vectors 10B (sparse motion field). In other words, a segment includes one or more sample positions for which MVs are not signaled in the bitstream, but rather derived using the interpolation approach determined for the segment and one or more of signaled MVs 10B. In some embodiments the segment size can be controlled to avoid appearing of the segments containing less than a predefined number of samples. It is noted, that such control can be skipped in some embodiments for complexity saving reasons. Desired number of samples may be a parameter of the segmentation algorithm and for the applications can be advantageously selected to be substantially less than the total number of samples in the picture (in the sparse motion field).

For samples of an interpolation segment, the MV encoding method further comprises a step S340 of determining the motion vector field 20B by applying the interpolation approach indicated by the motion interpolation information for the segment and using at least one of the two or more motion vectors 10B. At the encoder side, the reconstructed motion vector field 20B may then be used, e.g. to perform motion compensation in order to perform inter-prediction, or the like. It is noted that the present disclosure is not limited to using the MVs in any particular way. The MVs may be merely included into the bitstream as additional information (feature map, or channel). Such additional information is not necessarily used for motion compensation. It may be used for prediction of the motion field of the consecutive frames or in other computer vision applications such as object recognition or detection or the like.

According to an embodiment, a method is provided for reconstructing a motion vector field for a picture, as shown in FIG. 4. The method comprises a step S410 of obtaining, based on a bitstream, two or more motion vectors. Each of the two or more motion vectors specify motion for a sample out of a first subset (e.g. the sparse motion field 10B) of the plurality of samples.

As mentioned above, with reference to encoder step S310, the motion vectors may be included in the bitstream explicitly or derivable therefrom. The positions of the MVs may be signaled in the bitstream or derived based on a predetermined rule (such as particular ordering of partitions).

The MV decoding method further comprises a step S420 of deriving a plurality of interpolation segments based on the obtained two or more motion vectors and one or more reference pictures to which the two or more motion vectors are related. This step corresponds to step S320 described above for the MV encoding. Accordingly, it may be performed in the same way at the encoder and the decoder. The deriving of the plurality of interpolation segments may include determining the locations of the segment and their size or form or both. The deriving of segments may include for each sample of the picture determining to which segment (among the plurality of segments) it belongs.

In some applications, a single reference picture may be used for all motion vectors in the current block. However, this is only one example. It may be advantageous to enable selection of the reference image for each motion vector or for a group of motion vectors, or the like. Moreover, one single sample may be reconstructed as a weighted average of samples referring to different reference pictures (such as biprediction or bi-directional prediction). For example, the weighted average may employ weights which are based on the distance (in terms of display order) of the respective reference pictures from the current picture.

Regarding the one or more reference pictures, it is noted that reference pictures are previously reconstructed pictures. On the encoder side, they are encoded and reconstructed (previously encoded), on the decoder side they are reconstructed (previously decoded).

The MV decoding method further comprises a step S430 of obtaining, based on the bitstream, motion interpolation information indicating, for each of the plurality of interpolation segments, an interpolation approach for reconstructing motion in the segment. This step corresponds to step S330 mentioned above, but the encoder may typically generate the motion interpolation information and include it into the bitstream, whereas the decoder may obtain the motion interpolation information from the bitstream or based thereon.

Moreover, the MV decoding method comprises, for samples of an interpolation segment, a step S440 of reconstructing the motion field 20B by applying the interpolation approach indicated by the motion interpolation information for the segment and using at least one of the two or more motion vectors 10B. The reconstruction step may be similar to step S340 mentioned above. In fact, both the encoder and the decoder side may have the same information available for reconstructing the motion field 20B. It is noted that the terms "motion field" and "motion vector field" are used interchangeably herein. The similar derivation of the segments on the encoder and the decoder side may provide the advantage that the segments (partitioning) for the transmission of the interpolation information does not need to be signaled.

It is noted that the segments mentioned herein are segments for specifying the interpolation method. They are different from the partitions use for other purposes in the encoder and decoder. In particular, the segments do not (necessarily) correspond to possibly employed partitioning in which one MV is sent per partition.

Applying the interpolation may be performed as interpolating motion vectors (of the motion field) which are not signaled in the bitstream from the two or more motion vectors that are conveyed in the bitstream. The interpolation of the motion field may be performed for each among the plurality of segments using the interpolation determined/indicated for the respective segment. It is noted that the picture is not necessarily fully covered by the segments. There may be portions which are not segmented. This may be for the reason that there is no motion (or a negligible motion, e.g. less than a predetermined threshold), so no motion field is necessary to reconstruct. However, it may be also due to other reasons such as application of different kind of coding such as intra coding or the like.

In an exemplary implementation at the encoder side and/or the decoder side, the motion interpolation information indicates, for each of the plurality of interpolation segments, an interpolation approach out of at least two predefined interpolation approaches. In other words, there may be a predetermined number K of selectable interpolation approaches. The encoder selects for each segment one of the K interpolation approaches and conveys the selection within the bitstream. The decoder then determines the interpolation approaches for the respective segments based on the bitstream and applies them to the respective segments to obtain the (dense) motion field.

In some exemplary implementations, the motion interpolation information is a binary flag indicating, for each of the plurality of interpolation segments, an interpolation approach out of a first interpolation approach and a second interpolation approach. For example, there is a one bit per segment indicated in the bitstream and specifying one among two possible interpolation approaches (switching between the two possible interpolation approaches).

The at least two predefined interpolation approaches may differ between each other and include nearest neighbor interpolation, bilinear interpolation, windowed sinc function based interpolation, and polynomial interpolation. However, it is noted that the present disclosure is not limited to these approaches. There are merely exemplary and any subset of them may be selectable. The selectable interpolation approaches may include other or further approaches. Some particular non-limiting examples of the interpolation using windowed sinc function may be interpolation with DCT-based interpolation filters, e.g. such as is used in HEVC, VVC, or EVC. Also obtaining the dense motion field from the sparse one can be performed using a neural network, e.g. comprising a few convolutional layers and activation functions (e.g. RELU, parametric RELU, sigmoid).

Figure 5:
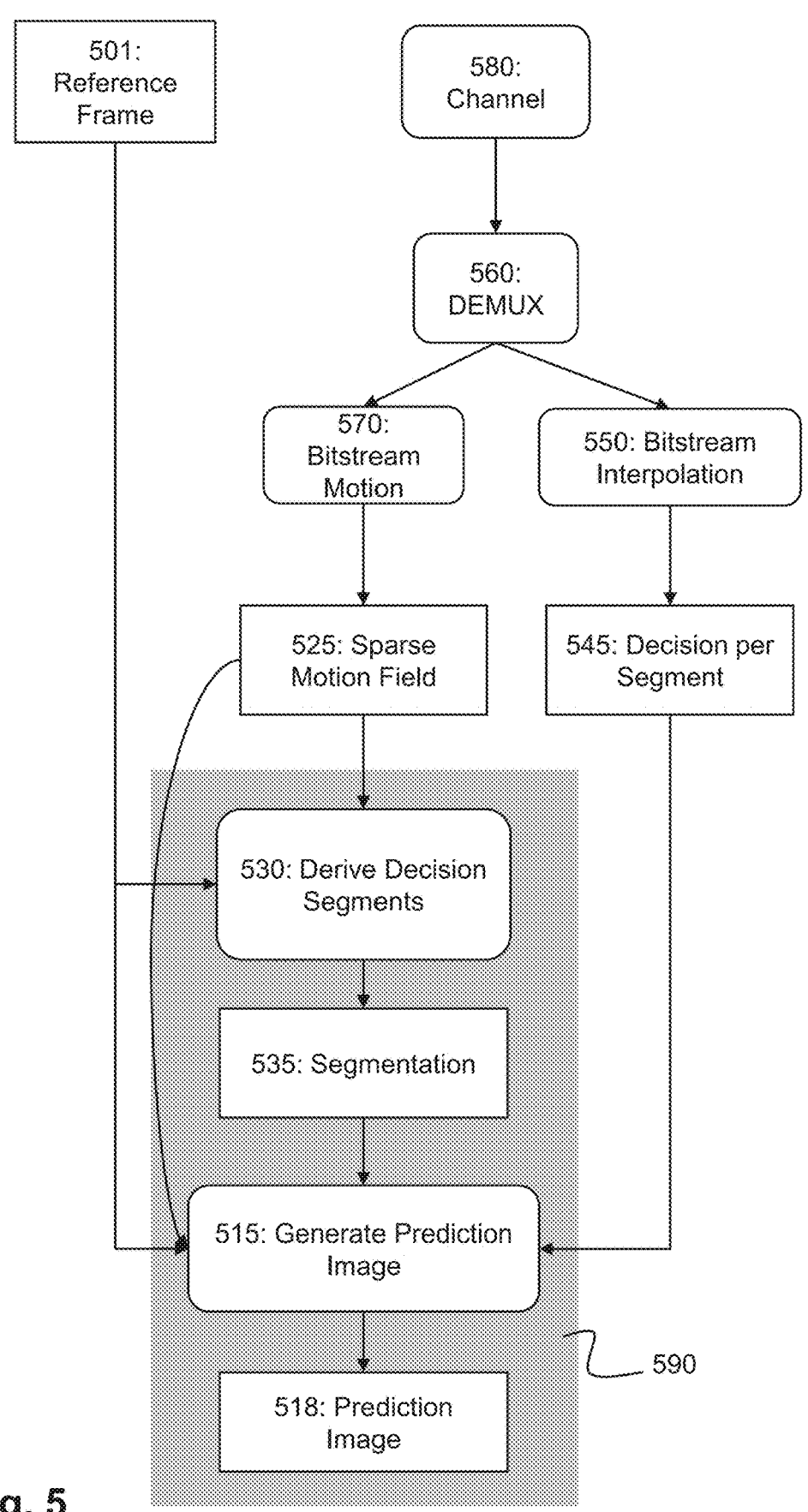
FIG. 5 is a flow diagram illustrating an exemplary implementation of a method for a decoder side.

A more detailed schematic diagram illustrating an exemplary implementation of the above MV decoding method (and the corresponding functionality of a decoder) is shown in FIG. 5. In particular, in FIG. 5, the corresponding decoder side diagram shows extracting 560 the sparse motion field 570, 525 and the switching information ("Decision per Segment") 550, 545 from the bitstream. Using the sparse motion field 525 and the reference frame 501, the decoder can repeat (derive in the same way as at the encoder) the segmentation. At this point, the decoder knows the segments 535, the sparse motion field 525 and the reference frame 501. Using these, the switching given by the decision per segment 545 can be executed and the prediction image 518 can be generated 515. In other words, at this point, the decoder knows the segments 535, the sparse motion field 525, the reference frame 501 and the per segment decisions 545. Using these, the prediction image 518 can be generated 515.

FIG. 5 shows as an input to the method a reference picture 501, which may be one (or more) of reference pictures from a reference picture buffer which stores some previously decoded pictures. Channel 580 represents bitstream which may be obtained via a transmission channel such as a wired or wireless channel for communication or an interface to a storage, or a broadcasting interface or the like. The bitstream from the channel 580 is demultiplexed (DEMUX) 560. The demultiplexing here refers to separating different kinds of information from the bitstream. In this example, motion information from the bitstream is parsed and/or decoded 570 to obtain sparse motion vector field 525, whereas interpolation approach from the bitstream is parsed 550 and/or decoded to obtain selection (decision) of interpolation per segment 545. In the segment based processing 590, the inputs are the reference frame 501, the parsed (decoded) sparse motion field 525 and the parsed selected interpolation per segment 545. When referring here to parsing and/or decoding, what is meant is obtaining from the bitstream the data. This may involve parsing them from the bitstream and, in addition may involve entropy decoding them from the bitstream. Parsing and decoding may be performed in one common step or in more steps. The decoding may, alternatively or in addition, include derivation based on other parameters already decoded.

The segment based processing 590 includes the derivation of the segments 530. Details of the derivation will be described based on an example with reference to FIG. 7. The result of the segment derivation 530 is the segmentation 535 of the dense motion field positions (corresponding to respective pixel position in the current picture). After obtaining the segments, they are associated with the respective parsed selected interpolations. The interpolations are used to interpolate MVs in the respective segments, thereby obtaining the dense motion field. A prediction image 518 is then generated 515 by motion compensated inter prediction.

Figure 6:
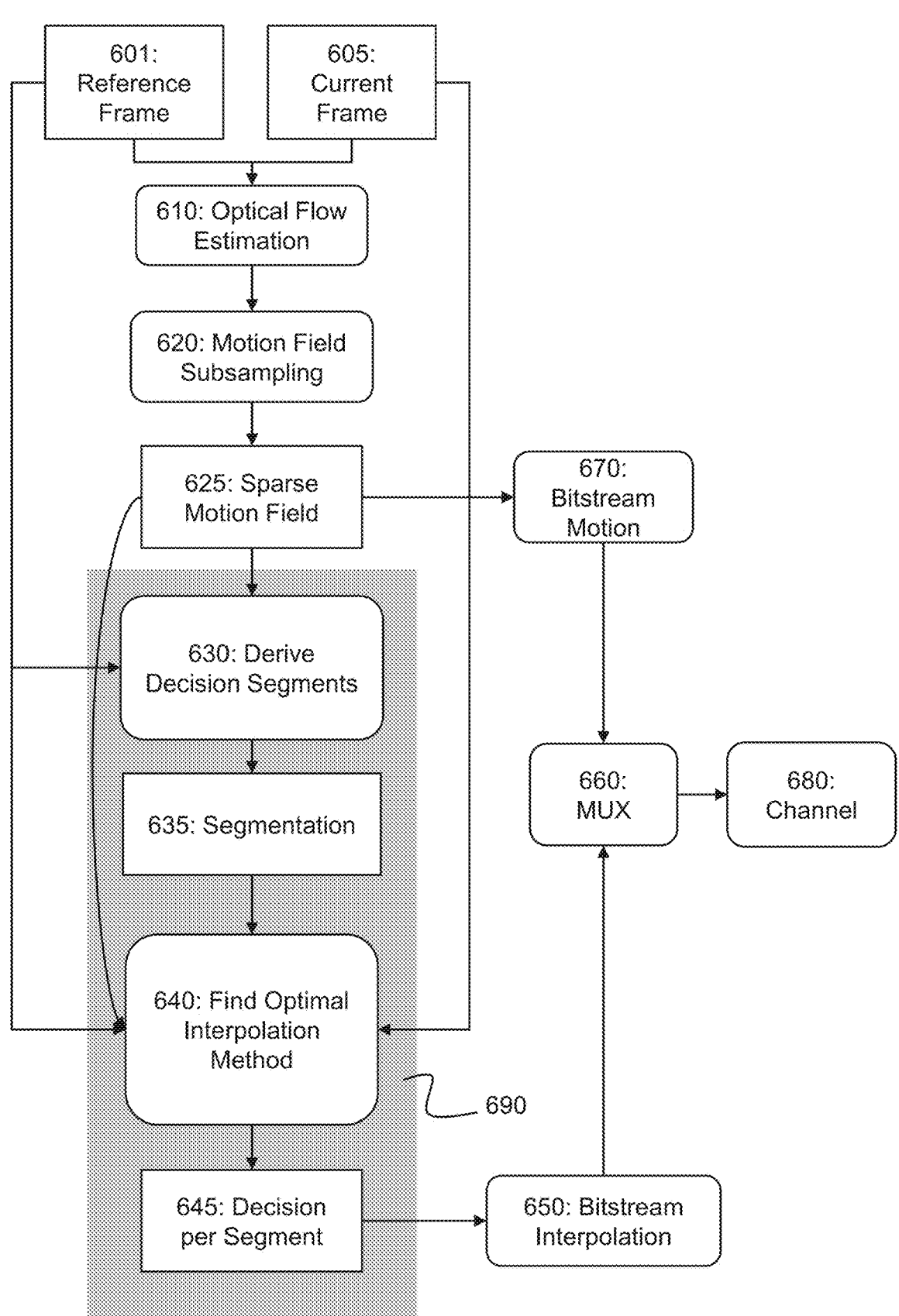
FIG. 6 is a flow diagram illustrating an exemplary implementation of a method for an encoder side.

FIG. 6 shows an exemplary encoder side. A reference frame 601 and a current frame 605 are used to derive a dense optical flow in step 610. Then, the optical flow is subsampled in step 620, thereby obtaining a sparse motion field 625. The sparse motion vector field is signaled in the bitstream 670. The sparse motion vector field is also used to derive 630 the segments 635. Step 630 also uses the reference picture 601 as will be explained below in more detail. Then an interpolation method is selected for each segment in step 640. The selected interpolations per segment 645 is then also converted into a bitstream in step 650. The portions of the bitstream carrying the interpolation selection 645 an the sparse motion field 625 are multiplexed in step 660 and provided to the channel 680 which may be the same as the channel 580 (but does not have to).

The sparse motion field which is transmitted over the channel is used together with the reference frame to derive segments for the decision. This derivation is the key component in aspects of the present disclosure. Using the obtained segmentation, the encoder can decide which interpolation method works better for each segment. Only these decisions are then written in the bitstream and transmitted to the decoder. In the current embodiment we transmit them in raw format, without entropy coding. In the following FIG. 6, we show the general procedure for the encoder where the elements with a gray background are part of the present disclosure. The segment based portion 690 as well as the segment based portion 590 at the decoder side both perform the derivation of the segments in a similar way in some embodiments.

Figure 7:
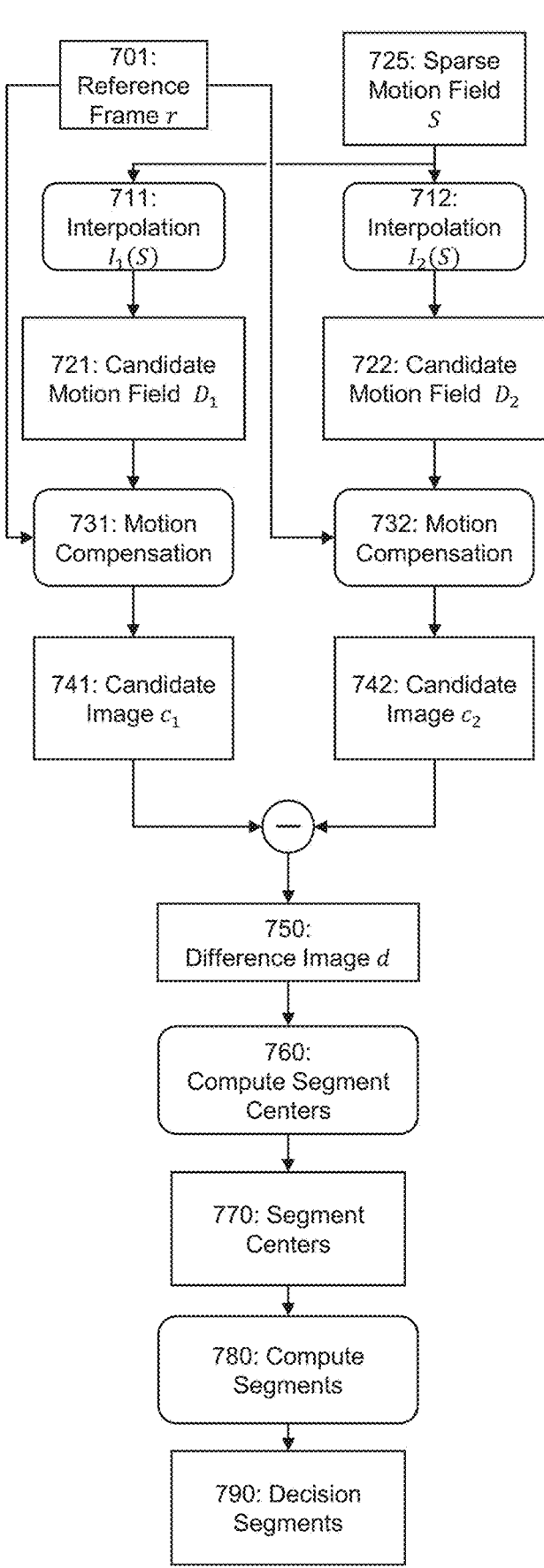
FIG. 7 is a flow diagram illustrating an exemplary implementation of a method for determining segments.

A segment derivation is illustrated in detail in FIG. 7. In particular, in the method described above with reference to FIG. 4, the deriving of the plurality of interpolation segments comprises:

obtaining a (one or more) reference picture 701 and a sparse motion field 725 including two or more vectors. As mentioned above, the reference picture 701 may be obtained from a reference picture buffer. The sparse motion field 725 may be obtained from the bitstream in the decoder and determined by optical flow subsampling or otherwise at an encoder.

reconstructing 711 a first motion field (first candidate motion field 721) by applying the first interpolation approach on the two or more motion vectors 725;

reconstructing 712 a second motion field (second candidate motion field 722) by applying the second interpolation approach on the two or more motion vectors 725;

reconstructing (e.g. by motion compensation 731) a first intermediate picture (referred to in FIG. 7 as candidate image) 741 using motion compensation with the first motion field 721;

reconstructing (e.g. by motion compensation 732) a second intermediate picture 742 (referred to in FIG. 7 as candidate image) using motion compensation with the second motion field 722;

determine 760 segment centers 770 of the plurality of interpolation segments according to a first predetermined rule at least in areas of the picture for which the first intermediate picture and the second intermediate picture differ; and for each of the determined segment centers, determine 780 samples of the picture which belong to the segment 790 based on a second rule.

FIG. 7 shows an exemplary implementation in which the segment determination is based on a difference picture 750 between the first intermediate picture 741 and the second intermediate picture 742. It is noted that the schematic flow and signal diagram in FIG. 7 is applicable in the same way and with the same steps at the encoder and the decoder side.

One advantage of the embodiments mentioned above is that information about the optimal motion field interpolation method can be conveyed efficiently. The method is non-block-based and is therefore suitable for video coders, where no block structure is available and does not produces blocking artifacts. However, the present disclosure may also be applied to codecs where the block structure do exist (e.g. for prediction purposes).

The segmentation may exploit that shapes, which occur in the ideal mask (defining selection of interpolation per segment) are often similar to the shapes, which occur in the difference image between two candidate images. The fact that the difference image conveys information how rewarding a switching can possibly be, is used by reasoning that a large difference between the candidate images means that much care should be made in the switching process, i.e. many bits should be spent.

In the following, parameters which are known in an exemplary implementation on the encoder side and the decoder side is described. Then some exemplary detailed embodiments for deriving the decision segments, the search for the optimal interpolation method, and the final generation of the prediction image are described.

The parameters in the following Table 1 are known at the encoder and decoder in this embodiment. They may be fixed beforehand (e.g. defined in standard) or transmitted (conveyed) as side-information in a bitstream. In one possible example which is described below in more detail, there are two selectable motion field interpolation methods.

TABLE 1

| Parameters known at encoder and decoder. | |
| --- | --- |
| Parameter | Description |
| N | Number of segments for switching. |
| $I_1(S)$ | First candidate interpolation method which maps the sparse motion field S to the dense motion field $D_1$ (e.g. see 711 in FIG. 7) |
| $I_2(S)$ | Second candidate interpolation method which maps the sparse motion field S to the dense motion field $D_2$ (e.g. see 712 in FIG. 7). |
| $\mathcal{C}(r, D)$ | Motion compensation function, which warps the reference image r (750) according to the dense motion field D ($D_1$ or $D_2$) |

Deriving the Decision Segments

The following procedure takes the reference frame (501 or 601) and the sparse motion field (525 or 625) as input and yields an ordered list of segments (535 or 635).

As mentioned with reference to FIG. 7, two different interpolation methods $I_1(S)$ and $I_2(S)$ are applied in steps 711 an 712 on the sparse motion field S 725 to obtain two dense candidate motion fields $D_1$ and $D_2$ (also denoted 721 and 722). These motion fields 721 and 722 are used to perform motion compensation 731 and 732, yielding the candidate images $c_1$ and $c_2$ (also denoted as 741 and 742). The procedure is not limited to any particular motion compensation method. For example, a linear image interpolation on a sample level may be applied during motion compensation. Other methods, like bicubic interpolation, tap filters (linear filters), or motion compensation which is refined by neural networks are also conceivable.

It is noted that the present disclosure is not limited to operating on a difference picture obtained by subtracting. In general, any measure reflecting dissimilarity or distance between the two candidate images may be applied. For instance, a guide function with features as described below may be applied. Thus, the term "difference picture" herein may be used in a more general context as a picture with samples reflecting dissimilarity or distance between the two candidate pictures.

Guide function g(x, y) for each position (x, y) of a difference picture returns the signed number (positive, negative or zero), which is further used in the interpolation type mask segmentation process. If g(x, y) equals to zero, it is interpreted as the lack of distinction between the different motion field interpolation methods for the position (x, y). Such positions are not considered in the interpolation type mask segmentation process according to an exemplary implementation. For the remaining positions it is supposed that for each point $(x_0, y_0)$ there is a neighborhood, where the optimal interpolation method is the same for all points having the same sign of g(x, y). So, in this neighborhood, optimal motion field interpolation method could be transmitted (conveyed in the bitstream) using only one index for all points having a particular sign of g(x, y). The absolute value of g(x, y) may be interpreted as an importance of a proper motion field interpolation method selection for the position (x, y).

The interpolation type mask segmentation process here refers to the determination of the segments. The term mask refers to an assignment between segments and the interpolation methods (approaches) selected for these respective segments.

The guide function may be constructed based on the candidate images (e.g. $c_1$ and $c_2$). A few non-limiting examples of such guide functions are provided below.

1. $g(x, y) = c_1(x, y) - c_2(x, y)$, where $c_1(x, y)$ and $c_2(x, y)$ are the values of sample corresponding to position (x, y) in the candidate images $c_1$ and $c_2$ respectively. This example corresponds to a difference image, which is obtained as pixel-wise differences between the first candidate image 741 and the second candidate image 742.

2.

$$g(x, y) = \begin{cases} c_1(x, y) - c_2(x, y), & |c_1(x, y) - c_2(x, y)| \geq t \\ 0, & \text{otherwise} \end{cases},$$

where t is a predefined threshold. With such definition of the guide function, positions, where the difference between the candidate images is smaller than the threshold, are not considered in the interpolation type mask segmentation process, as g(x, y) is equal to zero in such positions. In some examples the threshold value t can be further subtracted from the non-zero values of g(x, y) to avoid function discontinuities. This example corresponds to a difference image obtained as pixel-wise differences, with a dead zone given by the threshold t, between the first candidate image 741 and the second candidate image 742.

3. $g(x, y)=\mathcal{D}(c_1(x, y)-c_2(x, y))$, where $\mathcal{D}$ is a denoising function, for example a total variation denoiser (e.g. the one shown in Antonin Chambolle, *"An algorithm for total variation minimization and applications,"* *Journal of Mathematical Imaging and Vision*, vol. 20, no. 1/2, pp. 89-97, January 2004). This example corresponds to a difference image, which is obtained as pixel-wise differences between the first candidate image 741 and the second candidate image 742 an then denoised by applying a pre-configured denoising filter.

4. $g(x, y)=c_1(x, y)-c_2(x, y)-\mathcal{M}(c_1(x, y)-c_2(x, y))$, where $\mathcal{M}$ is a moving average filter. That way the function reacts stronger to the edges. This example corresponds to a difference image, which is obtained as zero-mean pixel-wise differences between the first candidate image 741 and the second candidate image 742. The mean is approximated by moving average in this example.

5. The functions listed under points 2, 3, and 4 above may be combined. For example, the denoised signal may be additionally subjected to thresholding as proposed under point 2 or subtraction of the estimated mean as in point 4.

It is noted that the candidate images can comprise more than one channel (e.g. R,G,B or Y,U,V or multiple "unnamed" channels in case of usage of neural network processing). In one exemplary implementation only one channel can be used for g(x, y) calculation (for example luminance (Y) channel of YUV color space). In the another example the guide function can be calculated as a linear combination of $g_k(x, y)$, where $g_k(x, y)$ is g(x, y) calculated for k-th channel of the candidate images ($g(x, y)=\Sigma c_k g_k(x, y)$, where $c_k$ is a constants). In the another example $$g(x, y) = \max_k g_k(x, y).$$

In other words, the present disclosure is not limited to application to a single channel or to color channels, it may be applied to other channels (such as general channels or a neural network or depth information channel or the like) and to a plurality of channels.

This guide function is now a basis for deriving the segments. Two steps are performed. First, a number of N segment centers is derived. It may be derived such that areas in which the difference image has a higher absolute value there are on average more centers. This consideration corresponds to the concept that in areas where the difference between the candidates is large, it may be desirable to spend more bits to transmit the information on a finer grid, since potential errors have a larger impact. The term "transmit" here refers to including into the bitstream.

After having obtained the centers, the (possibly all) pixels of the image are assigned to centers to form the segments. In other words each pixel that is to be segmented is assigned to one center. The segments would advantageously resemble the shapes, which can be observed in the difference image. The resulting segmentation is then returned to a higher level, such that the optimal interpolation method can be determined for each segment at the encoder or the switching can be executed at the decoder.

Computing the Segment Centers

In the following two alternative algorithms are exemplified on how to generate segment centers with the desired properties: The density should be higher when the difference image has a higher absolute area. The following considerations rely on random processes, however, the embodiment uses pseudo-random generators, such that the process is deterministic and can be exactly repeated at the decoder by setting a certain initial state (seed) for the pseudo-random generator. In an embodiment, PCG64 as implemented in numpy (available on https://numpy.org/doc/stable/reference/random/bit_generators/pcg64.html?highlight=pcg64#numpy.random.PCG64) may be used.

It should be noted that a number of the non-zero values of d(x, y) should be greater than or equal to the desired number of centers N. In the other words, as centers are selected from the points where d(x, y) is non-zero, it's impossible to generate more centers than the number of the points where d(x, y) is non-zero. In some exemplary implementation the additional step which set N=min(N, K), where K is a number of points with non-zero values of d(x, y), is performed before using the algorithms described below.

Example 1: Non-Uniform Sampling

In the first exemplary approach, a non-uniform sampling of all pixels is performed. The non-uniform sampling is implemented by consecutively picking pseudo-random points out of the set of all points within the frame. The probability for each point to be picked is proportional to the absolute value of the difference image at this point. Note that this method effectively excludes points where the difference is zero as probability to be picked is equal to zero for such points.

The particular implementation may be performed in any manner. For example, the random pick may be performed only for points (e.g. samples, pixels) which have a value larger than a threshold. In this way, zero valued (if the threshold in zero) points or points with small values can be excluded (never being selected) straight away. A similar effect may be achieved by quantizing the difference picture before the random pick or by other means. When referring to "consecutively picking pseudo-random points", what is meant is, e.g., that, a pseudo-random number is generated, and based on the pseudo-random number, it is decided which point is selected to be a center of segment. In some embodiments the point is selected out of the set of all points within the frame not selected as a centers in a previous steps. In the other examples point is selected out of the set of all points within the frame and then if the selected point is already in a center set (has been already selected as a center before), one more iteration is performed.

In one exemplary embodiment, the pseudo-random numbers may be pre-generated and reused for a few frames. In such example the pseudo-random numbers can be uniformly distributed, and the picking method uses two inputs: random number and the difference picture.

Basically, any implementation of the approach is possible in which a decision is made on whether or not the point is selected a center of a segment, wherein the probability of selecting the point depends on its magnitude.

In detail, this may be implemented the following exemplary way: The image is vectorized, so there is a clear order defined. For example:

$$d'(n) = d\left(\left\lfloor \frac{n}{H} \right\rfloor, n \bmod H\right)$$

where H is the height of the image and d(x, y) is the difference image as defined above (corresponding to one specific example of the guide function g(x, y)) at the position (x, y). Denote number of samples in a picture as K, then the d'(n), n=0, 1, . . . , K−1 is the vectorized image with index n denoting the image position (points).

Then the probability Pr(s=n) for each point (with position n in the vector d'(n)) is computed according to:

$$Pr(s = n) = \frac{|d'(n)|}{\sum_{n'} |d'(n')|},$$

with n as the index in the vectorized image and s as the index of the sampled point.

In some embodiments equation $$Pr(s = n) = \frac{|d'(n)| + \epsilon}{\sum_{n'} |d'(n')| + \epsilon},$$

with a small constant $\epsilon$, like $\epsilon=10^{-9}$ can be used instead, to avoid division by zero.

The cumulative distribution function, CDF, is computed as follows:

$$CDF(n) = Pr(s \le n) = \sum_{n'=0}^{n} Pr(s = n')$$

Afterwards, a pseudo-random number $i_{rand}$ is generated from the range [0, 1]. The point is with the index s' is sampled, if s' is the minimum index from the range [0, K−1] for which $$i_{rand} \le CDF(s')$$

This procedure constitutes a procedure for random sampling with given probabilities as implemented in several software libraries, including the above-mentioned numpy. However, this is only an exemplary implementation and the present disclosure may be implemented using various approaches leading to similar or same results, as also already mentioned above.

From the formulas provide above, an exemplary algorithm can be formulated to implement this functionality in integer arithmetic. In the following, W and H denote the width and height of the image, respectively. All indices start with zero.

Segment Centers Generation Algorithm Based on Non-Uniform Sampling

1. Initialize empty set of Samples S
   This set may have as many elements as there are points to be sampled or not sampled (selected as centers or not).
2. Set $T=\Sigma_{x,y}|d(x, y)|$
   T is a sum of absolute values of differences in the difference picture (one particular example of the general guide function g(x, y), for example d(x, y)=g(x, y)).

In some examples, if T is relatively small (e.g. comprise less than 8 bits), the values d(x, y) can be multiplied to the same constant C to make value T greater than the predefined constant, e.g. 255. It can be beneficial if bitwise PRNG is used.

Basically, for this algorithm it may be desirable to construct the difference d(x, y) in such a way that guarantees that non-zero values of |d(x, y)| are greater than or equal to one.

3. Set p[n]=d(n/H, n mod H)
   In this step, the difference image is vectorized into vector p[n].
4. Set $$c[n] = \sum_{n'=0}^{n} |p[n']|$$

In this step, the vector of scaled values of CDF c[n] is calculated (scaled CDF means CDF multiplied by T; in general CDF values would be between 0 and 1).

5. Until N samples were generated:
   5.1 Retrieve $\lceil \log_2 T \rceil$ random bits from the PRNG (a pseudo-random number generator) and assign the value to R
   5.2 If R>T, then go back to start of iteration ('continue')
   5.3 Find the smallest s∈ [0, K−1] such that R≤c[s]
      The values c[s] induce the partition of the interval [0, T] (from which value into is selected) into K intervals [0, c[0]], (c[0], c[1]], . . . , (c[K−2], c[K−1]=T]. In this step, the randomly generated value R∈ [0, T] is mapped to the sample index s∈ [0, K−1] according to the number of the interval to which value R belongs to.
   5.4 Set x=s/H and y=s mod H
   5.5 If (x, y)∈ S, then go back to start of iteration ('continue')
      In this step, if the position is already picked (within the set S of samples), it is not added again.
   5.6 Insert (x, y) to S
      If the position has not yet been picked (within the set S of samples), it is added thereto.
6. Return set of samples S Using this procedure, N points are consecutively sampled and returned as centers. In other words, the result are N samples in the set S. The vectorization may then be reversed back to the 2D image plane, before using the centers in the next step. This already yields a natural ordering of the centers and therefore the segments. However, the vectorization is only an exemplary implementation measure, and it is conceivable operating in 2D with some pre-defined ordering.

An example of the centers generated by this algorithm can be found in FIGS. 8A-C. FIG. 8A shows the difference image. FIG. 8B shows the black pixels indicating the picked centers. It can be seen that there are more samples in FIG. 8B where the difference image FIG. 8A is either small (dark) or large (bright). In the shown difference image FIG. 8A, gray denotes the value 0.

In summary, the non-uniform sampling described above leads to a set S of N samples corresponding to centers of the segments. However, the non-uniform sampling is only one possible exemplary way how to derive the centers so that it is possible to derive them at in the same way at the encoder and decoder without additional signaling.

Weighted Noise Thresholding

Another exemplary implementation referred to herein as weighted noise thresholding will be described in the following. This procedure follows a different, alternative approach (in comparison to the non-uniform sampling), where a threshold $\vartheta$ is defined and then a uniform noise signal is generated, with the same size as the image. It may be desirable for the noise to have a high kurtosis such that points with a lower difference still have some chance to be picked. A possible, exemplary and advantageous choice for such desired outcome is a log-normal distribution. In general, a higher kurtosis corresponds to presence of more outliers (values farther from the mean).

After obtaining the noise image, the noise is multiplied (point-wise, i.e. pixel-wise) with the difference image. Then, those points are picked (selected) as centers, for which this value (product of the noise sample and the absolute difference image value) exceeds a threshold $\vartheta$. The sampled centers are then ordered, for example according to the absolute value of the difference image multiplied with the noise (if the values are the same, sample positions in the raster order can be additionally considered). In another example the ordering can be performed based on only on the sample positions in the raster order. It is noted that the other ordering schemes can be used, the only requirement is that the ordering should be performed synchronously in the encoder and the decoder side.

This approach has the advantage that it can be performed non-sequentially (in parallel) with simpler operations. The threshold can also be determined by setting a number of points and picking $\vartheta$ accordingly. For example, for a larger number of points, the threshold would be lower. FIG. 8C shows an example for a set of centers generated with a log-normal noise with $\sigma=2$.

Pseudo Random Number Generator

The segment center generation procedure as exemplified above contains a pseudo random number generator (PRNG). A PRNG is a system which generates seemingly random number sequences. The output depends on the current state of the system and an initially chosen seed. After one number was generated, the current state is updated deterministically. That way, the random number sequence is fully defined by the seed and the initial state, which is usually specified for the algorithm. Thus, knowing the seed is sufficient to generate the same pseudo random number sequences multiple times. This seed could be predefined or signaled in a bitstream, e.g. as an element of a high-level syntax. In this way, it is possible to obtain the same results of the pseudo-random number generator at the encoder and the decoder. Thus, the encoder and decoder of the motion information are capable of deriving the same segments.

There are different PRNGs available, which vary in quality regarding different statistic properties, like period lengths. Examples include the linear congruentaial generator, the Mersenne Twister, the Permuted Congruental Generator PCG64, which has been used in this exemplary embodiment to generate pictures of FIGS. 8*a-c*, or the Middle Square Weyl Sequence PRNG. All mentioned PRGNs operate on a byte level and do not use floating point operations, they are therefore particularly suitable for use in coding.

In some embodiments, PRNGs is used to introduce non-regularity to the process. Therefore, the PRNG for this purpose does not have to have very good statistic properties which are often used to rate the quality of a PRNG. Many random generators are designed to produce sequences, which are statistically indistinguishable from true random experiments. However, for the present application, it is sufficient if the PRNG produces a sequence of the values with the same probability distribution. In fact, for the non-uniform sampling method, it would be sufficient to save N random numbers between 0 and 1, which can be re-used each time (within the step 5.1, considering the value of T) this method is used. In other words, it is not required that the PRNG is rune every time for the algorithm. For example, for the weighted noise thresholding, one random number for each pixel in the image can be saved. Thus, there is a room for designing an efficient and implementation depending on the computational and storage means at disposal.

Computing the Segments

After obtaining the segmentation centers, the remaining points of the image (positions) are assigned to the centers to form the segments. In other words, each (relevant) point of the image is assigned to one center. Only the points where the difference image is zero do not need to be assigned, since switching does not make any difference there.

When referring here to each point assigned to a center or all points assigned to the center, what is meant is all points that are to be segmented. This may be all points of the picture. However, not necessarily: the zero or otherwise small values may be excluded from segmentation. Moreover, it is conceivable to segment only parts of a picture (certain objects or certain pre-determined portions of the picture for which the motion is estimated/compensated).

In an exemplary embodiment, the points are assigned to the centers by the following rule: Each point is assigned to the closest center, where the sign of the difference image is the same (for the point and for the center).

Figure 9:
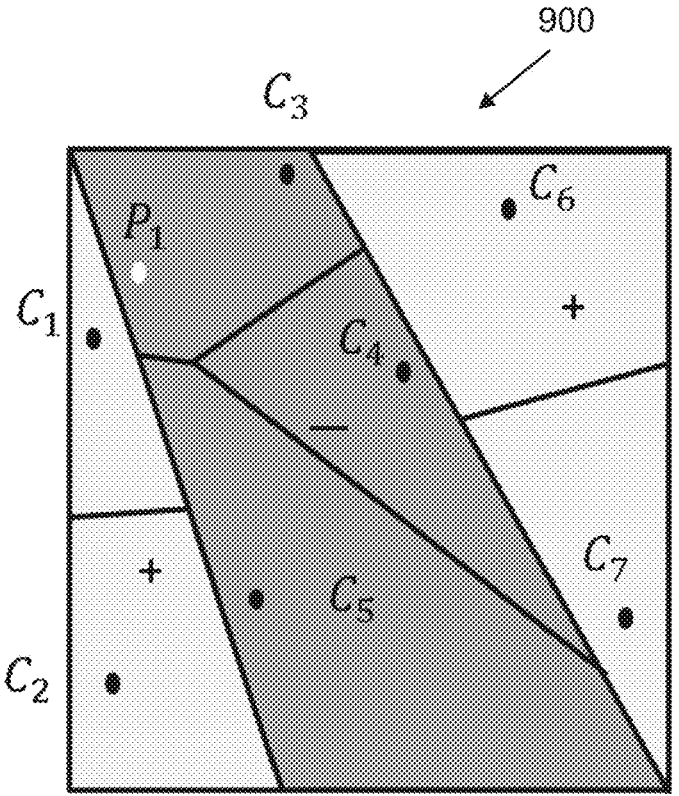
FIG. 9 is a schematic drawing illustrating, how segments may be determined.

In FIG. 9, an example 900 of the segment generation is shown. Here the dark gray area and the light gray areas represent areas where the difference image has a negative or positive sign, respectively. This is also shown by the '+' and '−' signs in the respective areas. There are seven centers $C_1$ to $C_7$ present, which are represented by black dots. The black lines show the boundaries of the derived segments. The resulting segments can be irregularly shaped, however, when only looking at the negative or positive area, the segments may be the Voronoi cells of the centers. Given a set of points, the Voronoi cell of a single point is defined as all points, which are closer to this single point than to any other point from the set of points (centers). The irregular shape here is a result of the irregular border between the positive and negative areas (areas with samples of positive and negative sign). Note that for example the point $P_1$, which is represented by a white dot, is assigned to center $C_3$ even though it is closer to center $C_1$. But since center $C_1$ lies in the positive part of the difference image, and $P_1$ as $C_3$ in the negative, $P_1$ is assigned to $C_3$.

The exemplary and non-limiting procedure mentioned above includes the following steps, where C is the set of all centers (e.g. obtained by the non-uniform sampling or weighted noise thresholding or otherwise) and P is the set of all points (all points to be segmented that is) in the image. $C \subset P$. In the following $p=(x, y)$ is a single point, and $d(p)$ is the value of the difference image at p. Voronoi(C, P) performs a Voronoi cell decomposition and returns a set V which contains sets containing the points of each Voronoi cell. C, V and the resulting set S are considered ordered sets.

Segment Construction Algorithm Based on Voronoi Cell Decomposition (Variant 1):

1. Set $P_+=\{p \in P | d(p)>0\}$ and $P_-=\{p \in P | d(p)<0\}$
   In this step, the picture points P are separated according to their sign to ether a positive picture part or a negative picture part. It is noted that in this exemplary implementation, zero values points are not segmented.

2. Set $C_+=\{p \in C | d(p) > 0\}$ and $C_-=\{p \in C | d(p) < 0\}$

In this step, the centers are separated according to their sign to either a positive picture part or a negative picture part. This step may be in fact a part of the step 1. However, for exemplary purpose, it is here provided separately, to establish notation.

3. Set $V_+=\mathrm{Voronoi}(C_+, P)$ and $V_-=\mathrm{Voronoi}\ C_-, P)$

In this step, Voronoi regions (cells) are computed (determined) separately for negative negative centers $C_-$ on one hand and for positive centers $C_+$ on the other hand.

4. Initialize empty set of segments S

5. For each $v \in V_+$ do 5.1. Add $v \cap P_+$ to S

In this step, positive segments are identified.

6. For each $v \in V_-$ do 6.1. Add $v \cap P_-$ to S

In this step, negative segments are identified.

7. Return S

Here, the set S of segments is complete.

In the implementation, a use is made of the property, that the segmentations within the positive and negative areas are Voronoi cells. Therefore, the set of all centers is split in one containing only points with positive difference and one containing only points with negative difference (step 1). The Voronoi cells are then computed for each subset in step 3. Each pixel in the positive area is then assigned to the segment which was derived from the centers with positive difference and vice versa in steps 5 and 6. This procedure is visualized in more detail in FIG. 10.

Figure 10:
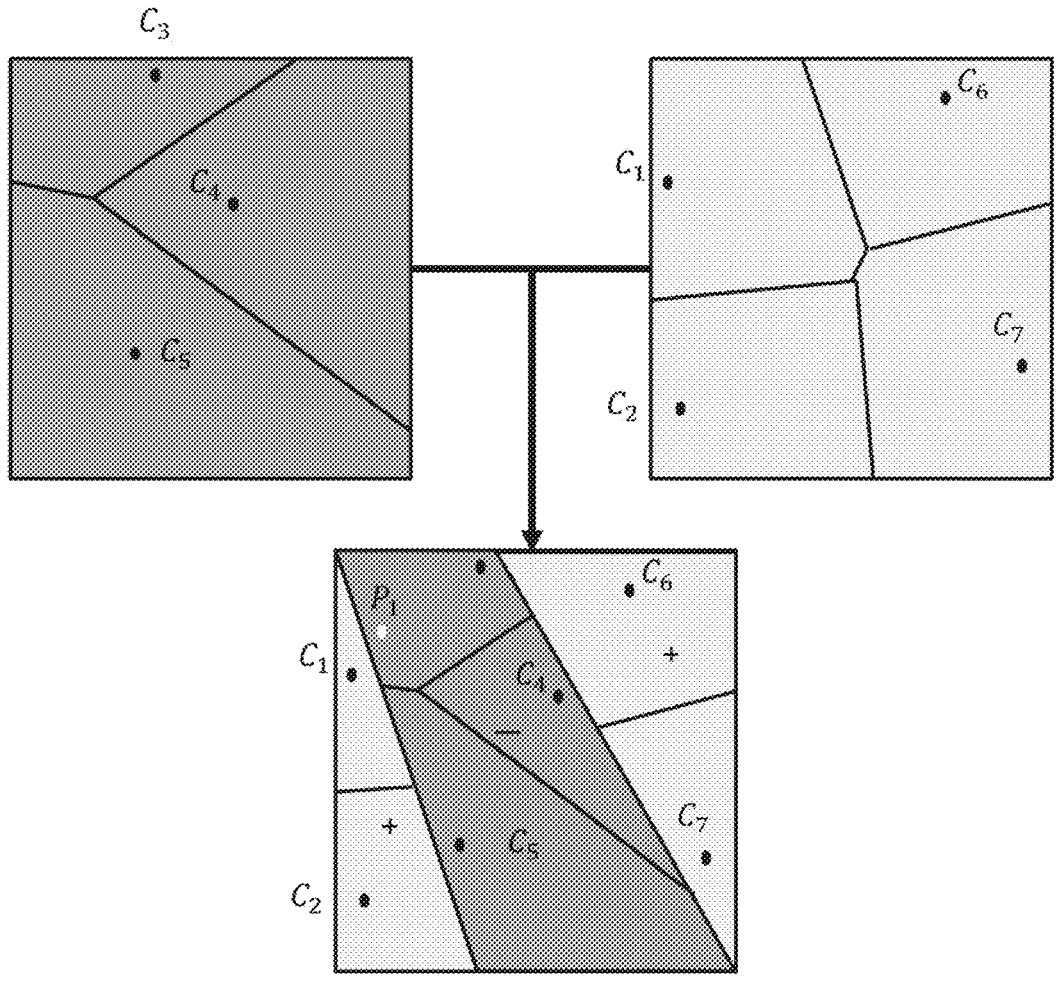
FIG. 10 is a schematic drawing illustrating, how segments may be determined.

In particular, FIG. 10 shows on the top left hand side the negative picture part Voronoi segmentation and the right hand side shows a positive picture part Voronoi segmentation (corresponding to step 3). Then the segments are identified as in steps 5 and 6, shown in the bottom part of FIG. 10.

Alternatively the segment construction algorithm can be formulated in a following manner (steps 1 and 2 are exactly the same as in the previous variant of the algorithm).

Segment Construction Algorithm Based on Voronoi Cell Decomposition (Variant 2):

1. Set $P_+=\{p \in P | d(p) > 0\}$ and $P_-=\{p \in P | d(p) < 0\}$

In this step, the picture points P are separated according to their sign to ether a positive picture part or a negative picture part. It is noted that in this exemplary implementation, zero values points are not segmented.

2. Set $C_+=\{p \in C | d(p) > 0\}$ and $C_-=\{p \in C | d(p) < 0\}$

In this step, the centers are separated according to their sign to ether a positive picture part or a negative picture part. This step may be in fact a part of the step 1. However, for exemplary purpose, it is here provided separately, to establish notation.

3. Set $V_+=\mathrm{Voronoi}(C_+, P_+)$ and $V_-=\mathrm{Voronoi}(C_-, P_-)$ in this step, Voronoi regions (cells) are computed (determined) separately for negative picture part $P_-$ and negative centers $C_-$ on one hand and for positive picture parts $P_+$ and positive centers $C_+$ on the other hand.

4. Return $S=V_+ \cup V_-$

The segments in FIG. 9 and FIG. 10 are fully-connected, but it have to be noted, that this is done just for the illustration purposes. In general, the segment can comprise a few isolated fully-connected areas or even a few isolated points. In some exemplary implementation an additional requirement for the segmentation procedure is formulated: segments have to be fully-connected (segments should not consist of two or more isolated parts, areas). Such a requirement could be implemented by selecting the biggest (with the biggest area) fully-connected part of the segment and adding the remaining parts to the "unsegmented area" for which the default motion field interpolation method is performed.

Figures 11A, 11B, 11C:
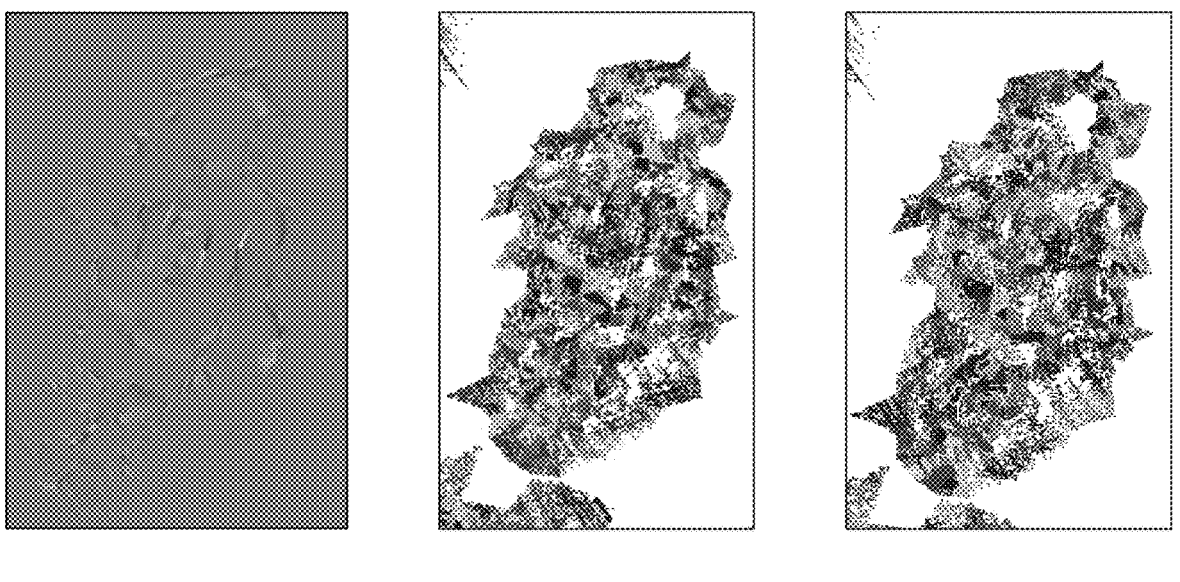
FIG. 11A-C are drawings illustrating intermediate results of a segmentation method according to the exemplary implementations.

FIGS. 11A-C show examples for the resulting segments, for non-regular sampling in FIG. 11B and for weighted noise thresholding in FIG. 11C. FIG. 11A shows the difference image. Here the gray levels show distinct segments in FIGS. 11B and 11C and were assigned arbitrarily, purely for good contrast. The white background shows pixels without segment, where the difference image is zero. When observing the shapes closely, it can be found that the edges appearing in the difference image (FIG. 11A) also appear in both segmentations.

When the segments are obtained, at the encoder side, an interpolation method per segment may be selected. In particular, according to some exemplary implementations, an optimum interpolation method per segment is selected. The optimum may be given by a cost function. The method may be selected out of the set of interpolation methods, which may include exactly two methods in some embodiments or may include more than two interpolation methods according to other embodiments.

As already discussed with reference to FIGS. 6 and 7, for an example with two selectable interpolation approaches, two respective candidate images are determined. Then it is iterated over all segments in the ordered list of segments to select for each segment the (better between the two selectable methods) interpolation method. The list of segments is advantageously ordered in order to enable inserting the indication of the selected interpolation method into the bitstream according to the order without explicitly signal the number of segment to which the indication pertains. The encoder and the decoder use the same ordering so that the decoder may obtain the indications from the bitstream and correctly assign them to the respective segments according to the order.

Back to an exemplary selection of interpolation method for a segment: a distortion metric (e.g. Mean Square Error (MSE)) may be calculated between each candidate image and the original image for the current segment (for which the interpolation method is being selected). If the first candidate image has a smaller MSE for the current segment, a first value (e.g. a '0') is signaled (inserted into the bitstream) for that segment. If the second candidate image has a smaller MSE for the current segment, a second value (e.g. '1') is signaled (inserted into the bitstream) for the current segment. This bitstream can then be encoded using any entropy coding method, for example context adaptive coding or the like. In this case, fractional number of bits needed for signaling 0 or 1 could be also considered in the optimization process in combination with the distortion metric (e.g. MSE). According to some exemplary implementation, when the entropy coding is used to encode the per-segment information about the proper motion field interpolation method, the segment ordering can be performed in a way, which allows to minimize the number of signalled bits for the abovementioned information. One possible implementation is to send interpolation method information at first for the segments obtained based on the "positive" centers (referred above as $C_+$) and then for the segments obtained based on the "negative" centers (referred above as $C_-$). Each subset is additionally ordered based on the center coordinates according to the raster order within the picture.

To generate 515 the prediction image 518, the decoder uses the segmentation, which was reconstructed following the same preset rules as the encoder.

A mask m which has the same size as the image is initialized with zeros. Afterwards, it is iterated over all derived segments in the ordered list and the values of the corresponding mask entries are set to the received decision. That way, a binary mask is obtained, containing 0 where the first method works best, and 1 where the second method works best. Here, in this exemplary implementation, points where the difference image is zero are interpolated by the first method by default. In another example, the index of a default method could be signaled in a bitstream. The default method may be one of the selectable methods or may be different from the two selectable methods. For example, the default method may be nearest neighbor copying (interpolation). Nearest neighbor interpolation means taking the motion vector of the nearest neighbor. In case of several neighbors in the same distance, there may be a processing order predefined, such as from top to bottom and from left to right or from left to right and then from top to bottom, or another processing order).

In order to further improve the quality, in some embodiments, a smoothing operation may be performed on the mask before applying the selection of the interpolation method accordingly. This has the reason, that current residual coders may have a problem with small outliers which can occur in this procedure in the form of isolated pixels using a different interpolation method than the surrounding pixels. This step, however, can be left out. For example, two alternatives for the smoothing may be: Gaussian kernel filtering or Guided Image Filtering (GIF). Using GIF may show a more stable behavior. However, the present disclosure is not limited to any particular smoothing so that other smoothing filters may be used alternatively.

For Gaussian kernel filtering, the mask may be filtered with a 2D-Gaussian kernel with a certain variance. This variance which controls the smoothing strength can be preset or can be subject to a rate-distortion optimization (RDO) at the encoder can be transmitted over the channel (e.g. signaled in the bitstream).

For Guide Image Filtering (cf. e.g. Kaiming He, Jian Sun, and Xiaoou Tang, *"Guided Image Filtering"*, *Proc. European Conference on Computer Vision*, 2010), the mask itself may be used as guide for the filtering. This results in a better edge preservation with the same smoothing of isolated pixels. The free regularization parameter a which determines the strength of the smoothing can also be preset or determined as a result of RDO and transmitted in bitstream.

After the smoothing of alternatively using the original binary mask, the switching is executed, e.g., by setting the final prediction image p to $$p(x,y)=(1-m(x,y))c_1(x,y)+m(x,y)c_2(x,y).$$

Here p(x, y) is the prediction image, $c_1(x, y)$ and $c_2(x, y)$ are the candidate images and m(x, y) is the mask. The mask may be binary or also assume values between 0 and 1 (expressable in fixed comma arithmetic) if smoothing was applied.

In an exemplary embodiment, $N=\lceil 0.2 R_{MV} \rceil$ segments are used, where $R_{MV}$ is the total number of bits spent for motion vector transmission before (e.g. for the transmission of the sparse motion field corresponding to the at least two motion vectors mentioned above). Since each segment costs 1 bit for transmission in this exemplary implementation with two selectable interpolation approaches, approximately or exactly ⅙ of the total bit-budget for inter prediction is used on the switching.

For subsampling and transmitting the motion vectors, a triangulation based backward adaptive motion field subsampling technique (TMVS approach, cf. Fabian Brand, Sirgen Seiler, Elena Alshina, and André Kaup, *"A Triangulation-Based Backward Adaptive Motion Field Subsampling Scheme"*, *Proc. International Workshop on Multimedia Signal Processing*, 2020, incorporated herein by reference) may be used in order to avoid signaling the motion vector positions (points). Approaches that can be used with the embodiments of the present disclosure include also the above mentioned PCT/EP2020/062062 and PCT/RU2020/000302. However, the present disclosure is not limited to such approaches and, in general, the motion vectors can be signaled or provided (derived) in any other way, as they are merely an input to the methods of the present disclosure, used to interpolate based on them the remaining motion vectors.

An example for the two selectable (candidate) interpolation approaches may be a linear interpolation and a nearest neighbor interpolation (corresponding to affine and translational motion models, respectively).

A possible configuration of an exemplary implementation is using non-regular sampling to generate the samples and the described Voronoi cell method to generate the actual segments and using guided image filtering (GIF) to smooth the mask after reconstruction at the decoder. Filter parameters may be derived based on the residual coding method used. For example for JPEG2000 as the residual coder filter, a radius of 4 and a regularization parameter of α=0.1 may be applied.

In general, the embodiments of the present disclosure may be used in a subsampling-based motion field transmission scheme after the motion field subsampling. The sparse motion field, which is transmitted over the channel is used together with the reference frame to derive segments for the decision. Using the obtained segmentation, the encoder can decide which interpolation method works better for each segment. Only these decisions are then written in the bitstream and transmitted to the decoder. In an exemplary implementation, the decision may be signaled in raw format, without entropy coding, or further encoded (losslessly compressed).

With the embodiments provided herein, switching information is transmitted to switch between two or more different motion field interpolation methods by splitting the image in segments and transmitting the best method per each segment. The segments are derived using only information available at the decoder. This way the segmentation does not have to be explicitly signaled to the decoder.

Further Specific Exemplary Extensions and Modifications

The present disclosure is not limited to the above-described very specific exemplary implementations. Rather, it opens the door to many more possible improvements and alternative components.

As already described above, the forming of the segments may include the following approach: for each of the determined interpolation segment centers, the samples of the picture which belong to the segment are determined as Voronoi regions in a difference picture obtained as a difference between the first intermediate picture and the second intermediate picture. The Voronoi regions are determined separately for areas of the difference picture with a positive sign and for areas of the difference picture with a negative sign.

However, for example, the segments are not necessarily derived by Voronoi cells as segments. The sampling grid used for sparsification of the motion field may be used. This may correspond to the Voronoi cells as segments, but it is only one option. Alternatively, Delaunay triangles may be applied as segments. This may be particularly desirable, if the above mentioned TMVS approach is used for sparsification of the motion field.

The segmentation approaches exemplified above may be modified. For example, a reference image based segmentation may be used. For example, if the image segmentation yields fine segments, the switching information can be directly transmitted based on these segments. If the segments produced by the image segmenter are too coarse that a transmission based on them is not sensible, the method mentioned above may be used to derive segments and refine them using object based segmentation. A reference image based segmentation may include, e.g. a neural network (NN, e.g. a convolutional NN, CNN) based segmentation. The segmentation may be a semantic segmentation (e.g. like in Detectron project https://github.com/facebookresearch/Detectron), for example performed during the encoding process. Considering the traditional methods, it could be some type of graph-based segmentation or gradient-based methods. In other words, the present disclosure is not limited to any particular kind of segmentation.

Picking the best method per segment may be based on different metric. In the above-mentioned embodiment, MSE was used for exemplary purposes. However, it is possible to use any other distance/dissimilarity metric, such as e.g. a modified MS-SSIM (multiscale structural similarity) for non-rectangular areas.

A full RDO may be possible for each decision. However, in order to simplify the decision in terms of computational complexity, other approaches may be used. Instead of selecting the method which yields the smallest error for each segment, the encoder could test both methods also taking into account the bit rate when the side information is entropy coded. In some exemplary implementations the best interpolation method for each segment can be selected first and then a few segment ordering approaches can be tried and the one delivered the minimal bit number after the entropy coding is selected. In this case the selected ordering method is additionally signaled in the bitstream. In some exemplary implementation the number of bits spent on a residual signal coding and quality of the reconstructed signal (which was obtained based on residual and prediction signals) can be also taken into account within the RDO.

Even though the above mentioned exemplary implementations provided two selectable approaches for interpolation, there may be more candidates. In such case, using a hierarchical switching may provide for an efficient selection of the interpolation method.

For example, to use more than two candidate motion fields, they can be grouped into two groups and it may be first signaled (indicated in the bitstream), which of these groups is optimal for each segment. Then, on a finer level, switching between the single methods in the group(s) may be performed. In this case the segmentation is performed multiple times with the method described above, once for each decision.

Specifically, for example, if there are four methods for motion field interpolation, four candidate images $I_1, I_2, I_3, I_4$ are constructed accordingly. Then the following steps are performed:

1. Deriving binary mask $m_1$ for pair $I_1/I_2$ and constructing combined frame $I_{12}$
2. Deriving binary mask $m_2$ for pair $I_3/I_4$ and constructing combined frame $I_{34}$
3. Deriving binary mask $m_3$ for pair $I_{12}/I_{34}$ and constructing final prediction $I_{1234}$.

Using different local similarity measures, other than the difference image, is also possible as already discussed in detail above.

Difference image may be calculated with a deadzone: It is possible to introduce a deadzone, such that all pixels with a difference smaller than a certain threshold are considered to be zero throughout the entire algorithm. That way we could save rate at the cost of quality. For example, within the segments generation algorithms, described above, instead of P, that is set of all points within the frame, set $P'=\{P\in P \|d(p)|>t\}$, where t is a non-zero positive threshold, can be considered. Motion field interpolation method for all points from $P\backslash P'$ could be predefined or its index can be signaled in the bitstream.

In general, the degree of difference between the first intermediate picture and the second intermediate picture is calculated sample-wise based on a dissimilarity measure. It is noted that the term "dissimilarity measure" here is employed for explanatory purposes. In general, any similarity measure may be used, because the degree of similarity also inversely indicates degree of dissimilarity. The degree of difference may be measured, for example, by any distance metric. Reference is made to the above mentioned examples of the guide function g(x, y).

In an exemplary implementation, the determining of centers of the plurality of interpolation segments is performed according to the first predetermined rule in areas of the picture for which the first intermediate picture and the second intermediate picture differ by more than a predefined amount. The predetermined amount may be zero in some embodiments. However, it may be larger than zero, corresponding to the dead zone mentioned above.

In the embodiments described with reference to FIGS. 3 to 7, the first predetermined rule specifies for instance a non-uniform sampling of samples of the picture, in which samples to be segment centers are selected pseudo-randomly with a predetermined seed (known and same for the encoder side and the decoder side). The probability of selecting a sample is proportional to the absolute difference between the first intermediate picture and the second intermediate picture.

Alternatively, the first predetermined rule includes the weighted noise thresholding which comprises: generating pseudo-random noise samples and obtain a noised difference picture by multiplying the pseudo-random samples (sample-wise) with the respective samples of a difference picture obtained as a difference between the first intermediate picture and the second intermediate picture; and selecting, as centers of the plurality of interpolation segments, samples of the noised difference picture which exceed a pre-determined threshold. It is noted, that if the difference (e.g. g(x, y)) can be negative at some positions, the absolute value can be advantageously used.

In general, for reducing complexity in some embodiments, no centers of the plurality of interpolation segments are determined in areas of the picture for which the first intermediate picture and the second intermediate picture meet a similarity criterion.

A similarity criterion may be that the corresponding area within the first intermediate picture and the second intermediate picture do not differ. The term differ can mean e.g. "non-zero difference" or "absolute difference more than the threshold" or other measures for difference as mentioned above. Said in other words, meeting a similarity criterion indicates that the first intermediate picture and the second intermediate picture are sufficiently similar in a particular area.

As described above, in an embodiment, the motion interpolation information includes for each of the plurality of interpolation segments a piece of motion interpolation information. The association of pieces of the motion interpolation information with each respective interpolation segment out of the plurality of interpolation segments is given by:

ordering of the pieces of the motion interpolation information in the bitstream syntax; and a predetermined ordering of the determined plurality of interpolation segments.

As mentioned above, the interpolation segments are determined in the same way at the encoder and the decoder, in some embodiments. Thus, when the order of the segments is known and kept the same at the encoder an the decoder, and when the syntax of the bitstream is known to both encoder and decoder, then an association between the segments and the side information (interpolation information) can be determined in the same way at the encoder and the decoder. For instance, a mapping may be pre-defined, possibly by a standard. It also could be a few predefined segment ordering methods and one of them can be selected based on number of bits required for side information coding (e.g. if an entropy coding is used). The selected method can be signaled in the bitstream. In the another example segment ordering method can be determining according to the predefined rule based on one or more of the followings: frame/slice type, temporal layer (in case of pyramid B-frames coding), quantization parameters (or any other parameters setting the desired reconstruction quality), resolution of the current frame, resolution of the reference frame (if it's not the same as the current frame resolution).

According to an embodiment, the above described methods may further comprise determining, for each sample of the picture, an interpolation approach according to the segment in which the sample is located, thereby obtaining a mask picture indicating in each mask picture sample the interpolation approach. In other words, the mask picture is a data structure, which includes per sample of the picture an indicator indicating the interpolation method to be applied. Such data structure is stored in a memory at the encoder and the decoder to be used for interpolation. It is noted that it is not necessary to store the entire mask at one time instance. The indications of the mask may be stored only for the time necessary to perform the actions (e.g. parsing, decoding, interpolation, encoding, filtering, or the like). The method may further include a step of assigning to the mask picture samples that belong to no segment a default interpolation approach. The approach may be one of the approaches selectable for the segments, or it may be an approach different from them. The method may further comprise determining for each sample of the picture a motion vector by applying the interpolation approach specified by the corresponding sample of the mask picture. The mask may be binary, in case there are only two interpolation methods selectable for each pixel (image sample).

Alternatively to the independent mask picture coding, a prediction of the mask pictures can be used. As was mentioned before, the particular motion field interpolation method corresponds to the specific motion model (e.g. nearest neighbor corresponds to the translational motion and linear interpolation corresponds to the affine motion model). For the natural content within one scene motion models are more or less similar for the same objects from frame to frame. Such similarity can be exploited by performing the predictive coding of the mask pictures. For example, the interpolation method for the segments laying on the particular object in the reference frame can be used as a prediction for the interpolation method for the segments laying on the same object in the current frame. Such predictive coding results in a bitrate saving for the supplementary information (per segment motion field interpolation method) transferring.

According to some exemplary implementations, the method further comprises a step of smoothing the mask picture before determining the motion vectors. The smoothing may be performed by Gaussian filtering or guided image filtering or by another method such as linear filtering or the like.

For instance, in the smoothing, each element of the mask becomes a real number from the interval [0, 1]. This number is used to obtain the reconstructed image sample as a weighted sum of two reconstructed candidate images. In other words, the first interpolation method is used to interpolate the first motion vector for the sample and the second interpolation method is used to interpolate the second motion vector for the sample. Then, a first candidate sample is formed by motion compensation using the first motion vector and a second candidate sample is formed by motion compensation using the second motion vector. Then the first candidate sample and the second candidate sample are weighted averaged with weights determined by the smoothing as described above.

In another example, instead of selecting a single interpolation method with which a motion vector is interpolated, two methods are used: the motion vector is interpolates with a first method and with a second method. Then, the resulting motion vector is a weighted average of the two interpolated motion vectors and the weights are obtained by the smoothing. The present disclosure is not limited to such an example. The weighted average may involve more than two interpolated motion vectors or more than two reconstructed candidate samples.

As mentioned above, it may be advantageous to perform determining the two or more motion vectors by sparsification of a motion field by applying Delauney triangulation. However, any other sparsification or any other determination of the sparse motion field (such as hierarchic splitting or the like) may be applied. In the present disclosure, the positions of the motion vectors and the motion vectors are input and may be determined in any manner. The term sparsification employed herein refers to subsampling of a motion field. It may be uniform or non-uniform.

At the encoder side, the method may further comprise selecting the interpolation approach for each of the plurality of interpolation segments according to a cost function including one or more out of rate, distortion and complexity. Such selection may be performed based on the original image (input to the encoder) and the reconstructed image. It is noted that the term "optimization" does not necessarily imply that a global optimum is achieved. The quality of the reconstructed image, its rate and/or computational complexity may depend on many parameters, which are not independent, so that simplifications may be performed in the optimization process so that a global optimum is not actually found. The term performing optimization refers to performing e.g. the RDO, i.e. trying out combinations of parameters and deciding based on a cost function including a quality term and a rate term, which of the parameters to take for the encoding.

However, it is not necessary to perform an RDO based on the reconstructed image and original image. It is conceivable that an optimization is performed for reconstruction of the motion field. In other words, the reconstructed motion field is compared to the original dense (before sparsification) motion field. This approach is possible when the encoder also performs the sparsification, i.e. has a knowledge of the original (possibly dense) motion field. However, the selection of the interpolation may be performed in any other way, e.g. considering the content importance for certain region of interest, the precision may vary, or the like. It is noted, that the knowledge of the original (possibly dense) motion field can be obtained not only from the optical flow methods, but also from the other channels, for example such kind of information can be provided to the encoder by the external tool or from the operation system in case of screen content coding.

In summary, in an embodiment, switching information is conveyed in the bitstream to switch between two or more different motion field interpolation methods by splitting the image in segments and transmitting the best method per each segment. The segments are derived using only information available at the decoder. This way the segmentation does not have to be explicitly signaled to the decoder. The segmentation exploits that shapes which occur in the ideal mask are often similar to the shapes which occur in the difference image between two candidate images. We furthermore exploit that the difference image conveys information how rewarding a switching can possibly be, by reasoning that a large difference between the candidate images means that much care should be made in the switching process, i.e. many bits should be spent.

Figure 12:
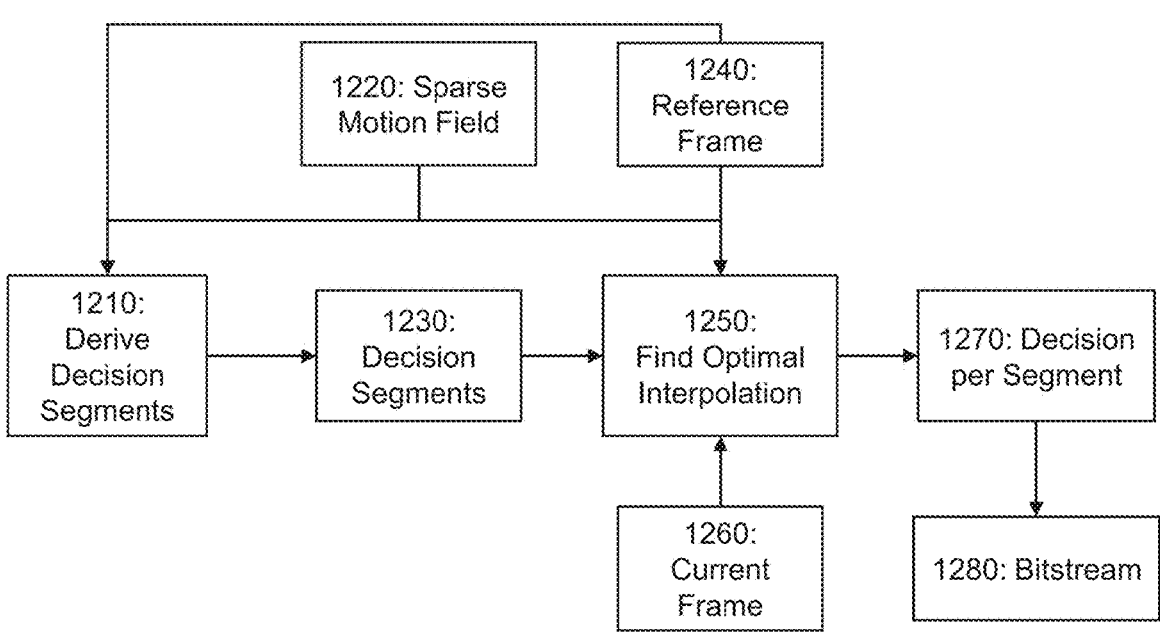
FIG. 12 is a block diagram illustrating functional features of an apparatus for encoding motion information.
Figure 13:
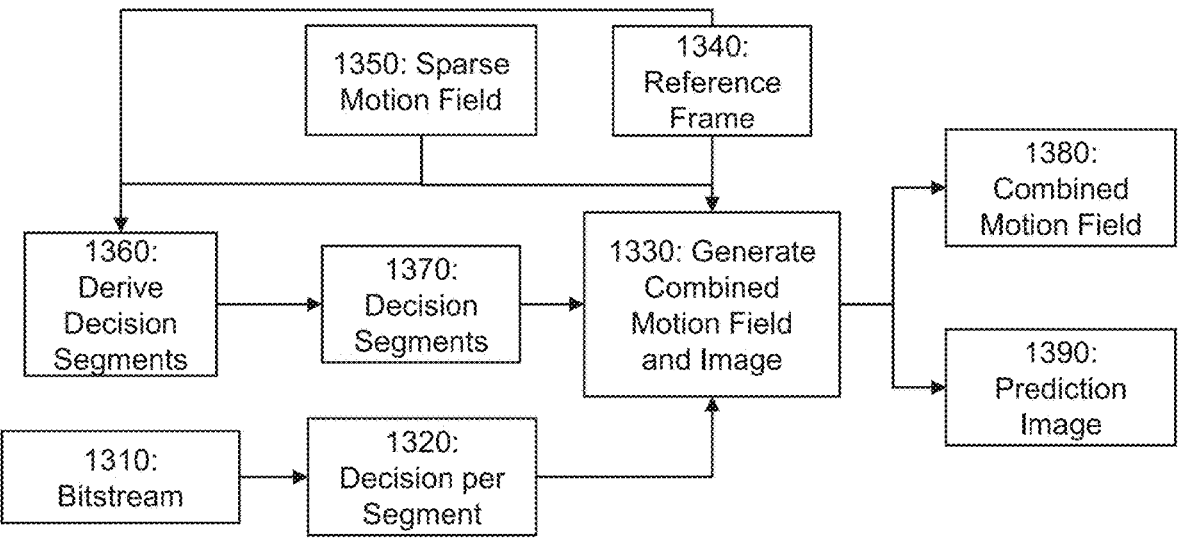
FIG. 13 is a block diagram illustrating functional features of an apparatus for decoding motion information.

Exemplary implementations of apparatuses with the corresponding functional features are shown in FIGS. 12 and 13.

According to an embodiment, an apparatus is provided for reconstructing a motion vector field for a picture comprising a plurality of samples. The apparatus and its functional modules is illustrated in FIG. 13. It may hardware-wise comprise a processing circuitry which is configured to perform the functions of the modules described below. These modules may be implemented by the same or by different processing circuitry parts and may be part of the same software or constitute separate computer code portions (programs). Sign 1310 illustrates bitstream which is e.g. stored in an external memory or storage device, or which is obtained over an interface of the apparatus (e.g. a port) from an external storage and/or over a communication connection (network). The bitstream 1310 does not refer to the bitstream of the entire video sequence. Rather, it refers to the currently processed relevant portions. As is known to those skilled in the art, it is sufficient to process a bitstream in a sliding window manner and only buffer parts used to reconstruct current picture or picture portion. Sign 1320 shows a functional module configured to parse (possibly also decode) from the bitstream the interpolation information. The interpolation information from the bitstream corresponds to a decision per segment, which interpolation method to apply.

Sign 1350 denotes module which is configured to obtain, based on a bitstream, two or more motion vectors (sparse motion field), each of the two or more motion vectors specifying motion for a sample out of a first subset of the plurality of samples.

A module 1360 is configured to derive a plurality of interpolation segments (which may be stored in a buffer) 1370 based on the obtained two or more motion vectors (sparse motion field obtained in module 1350) and based on one or more reference pictures to which the two or more motion vectors are related. The one or more reference pictures are obtained by module 1340. For example, module 1340 corresponds to a routine, which fetches the reference picture from a reference picture buffer. Module 1340 may, but does not have to comprise the reference picture buffer.

As mentioned above, module 1320 is configured to obtain, from the bitstream, motion interpolation information indicating, for each of the plurality of interpolation segments, an interpolation approach for reconstructing motion in the segment. The obtained motion interpolation information (decision segment) is provided to a module 1330, which reconstructs the original (e.g. dense) motion vector field 1380. Module 1330 may (but does not have to) also reconstruct the image (picture) 1390.

In other words, for samples of an interpolation segment, the module 1330 reconstructs the motion vector field by applying the interpolation approach indicated by the motion interpolation information for the segment and using at least one of the two or more motion vectors.

Similarly to the encoder, according to an embodiments illustrated in FIG. 12, an apparatus is provided for encoding a motion vector field for a picture comprising a plurality of samples. The apparatus comprises a processing circuitry configured to perform functionality of functional modules shown in FIG. 12. Similarly as for the decoder described above with reference to FIG. 13, the encoder may be also implemented as a combination of hardware and software.

The apparatus generates a bitstream 1280. Module 1220 provides a sparse motion field represented by two or more motion vectors, each of the two or more motion vectors specifying motion for a sample out of a first subset of the plurality of samples. This motion field may be included into a bitstream, or, specifically, into the bitstream 1280. It is noted that the term "bitstream" here is employed generally, the motion field information and the interpolation information may be conveyed within different bitstream portions, in different packets or sub streams, or the like. It is conceivable that the motion field information is derived from another source or stream, or already stored at the decoder so that the present encoder apparatus only codes into the bitstream 1280 the interpolation information.

Module 1210 is configured to derive a plurality of interpolation segments 1230 based on the two or more motion vectors 1220 and a one or more reference pictures 1240 to which the two or more motion vectors are related. The one or more reference pictures are obtained by module 1240. For example, module 1240 corresponds to a routine, which fetches the reference picture from a reference picture buffer. Module 1240 may, but does not have to comprise the reference picture buffer.

Module 1270 is configured to encode, into the bitstream 1280, motion interpolation information indicating, for each of the plurality of interpolation segments 1230, an interpolation approach for reconstructing motion in the segment. The interpolation approach is determined by the encoder apparatus e.g. in module 1250 which may be configured, for samples of an interpolation segment, determine the motion vector field by applying the interpolation approach indicated by the motion interpolation information for the segment and using at least one of the two or more motion vectors. In particular, e.g. the module 1250 may perform optimization based on reconstructed picture which is reconstructed based on the decision segments 1230, based on the original (currently encoded) image picture 1260 and based on the sparse motion field 1220 as well as reference picture 1240.

In the following, exemplary apparatuses are further described with reference to FIGS. 14 to 20, illustrating some embodiments of the present disclosure.

Figure 14:
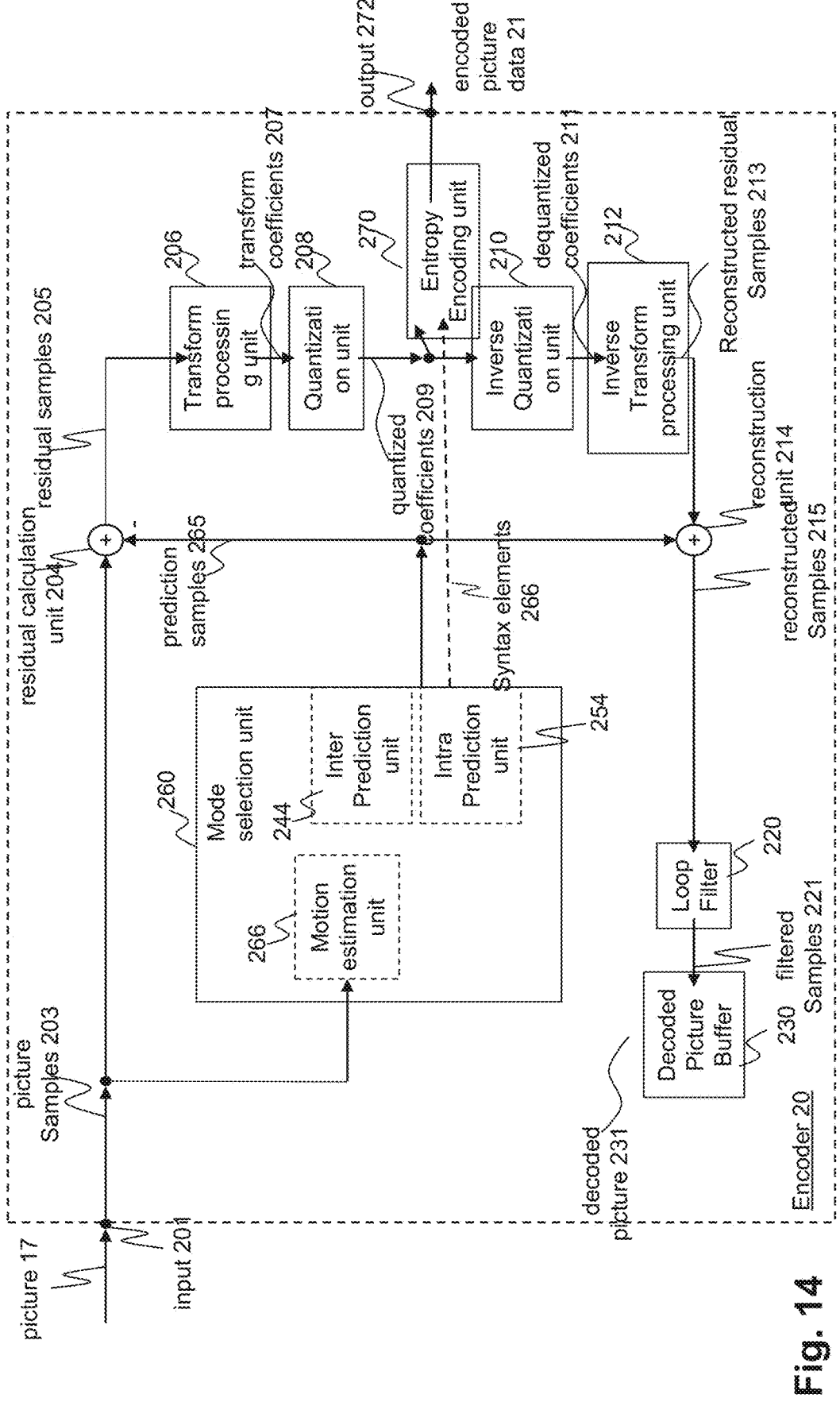
FIG. 14 is a block diagram illustrating an exemplary picture encoding apparatus which may implement some embodiments of the disclosure.

FIG. 14 illustrates an example of one such embodiment. In particular, a motion estimation unit 266 may be used to provide motion vectors for the inter prediction according to some embodiments described above. FIG. 14 shows a schematic block diagram of an example video encoder 20 that is configured to implement some of the techniques of the present application. In the example of FIG. 14, the video encoder 20 comprises an input 201 (or input interface 201), a residual calculation unit 204, a transform processing unit 206, a quantization unit 208, an inverse quantization unit 210, and inverse transform processing unit 212, a reconstruction unit 214, a loop filter unit 220, a decoded picture buffer (DPB) 230, a mode selection unit 260, an entropy encoding unit 270 and an output 272 (or output interface 272). The mode selection unit 260 may include an inter prediction unit 244, an intra prediction unit 254. Some embodiments of the present disclosure may relate to inter-prediction. Instead of a hierarchic partitioning unit (not shown) as used in state of the art codecs, the triangulation based segmentation may be used. In the motion estimation, part of the inter-prediction, the motion flow estimation 266 may be implemented, including, e.g. an optical flow (dense motion field) determination according any of the known approaches, motion field sparsification, segment determination, interpolation determination per segments, and indication of the interpolation information within a bitstream (e.g. via the entropy encoder 270). Inter prediction unit 244 performs prediction of the current frame based on the motion vectors (motion vector flow) determined in the motion estimation unit 266.

The residual calculation unit 204, the transform processing unit 206, the quantization unit 208, the mode selection unit 260 may be referred to as forming a forward signal path of the encoder 20, whereas the inverse quantization unit 210, the inverse transform processing unit 212, the reconstruction unit 214, the buffer 216, the loop filter 220, the decoded picture buffer (DPB) 230, the inter prediction unit 244 and the intra-prediction unit 254 may be referred to as forming a backward signal path of the video encoder 20, wherein the backward signal path of the video encoder 20 corresponds to the signal path of the decoder (see video decoder 30 in FIG. 3). The inverse quantization unit 210, the inverse transform processing unit 212, the reconstruction unit 214, the loop filter 220, the decoded picture buffer (DPB) 230, the inter prediction unit 244 and the intra-prediction unit 254 are also referred to forming the "built-in decoder" of video encoder 20.

The encoder 20 may be configured to receive, e.g. via input 201, a picture 17 (or picture data 17), e.g. picture of a sequence of pictures forming a video or video sequence. The received picture or picture data may also be a pre-processed picture 1519 (or pre-processed picture data 1519). For sake of simplicity the following description refers to the picture 17. The picture 17 may also be referred to as current picture or picture to be coded (in particular in video coding to distinguish the current picture from other pictures, e.g.

previously encoded and/or decoded pictures of the same video sequence, i.e. the video sequence which also comprises the current picture).

A (digital) picture is or can be regarded as a two-dimensional array or matrix of samples with intensity values. A sample in the array may also be referred to as pixel (short form of picture element) or a pel. The number of samples in horizontal and vertical direction (or axis) of the array or picture define the size and/or resolution of the picture. For representation of color, typically three color components are employed, i.e. the picture may be represented or include three sample arrays. In RBG format or color space a picture comprises a corresponding red, green and blue sample array. However, in video coding each pixel is typically represented in a luminance and chrominance format or color space, e.g. YCbCr, which comprises a luminance component indicated by Y (sometimes also L is used instead) and two chrominance components indicated by Cb and Cr. The luminance (or short luma) component Y represents the brightness or grey level intensity (e.g. like in a grey-scale picture), while the two chrominance (or short chroma) components Cb and Cr represent the chromaticity or color information components. Accordingly, a picture in YCbCr format comprises a luminance sample array of luminance sample values (Y), and two chrominance sample arrays of chrominance values (Cb and Cr). Pictures in RGB format may be converted or transformed into YCbCr format and vice versa, the process is also known as color transformation or conversion. If a picture is monochrome, the picture may comprise only a luminance sample array. Accordingly, a picture may be, for example, an array of luma samples in monochrome format or an array of luma samples and two corresponding arrays of chroma samples in 4:2:0, 4:2:2, and 4:4:4 colour format.

Embodiments of the video encoder 20 as shown in FIG. 14 may be configured to encode the picture 17 block by block or per frame, e.g. the encoding and prediction may be performed per block 203. For example, the above mentioned triangulation may be performed for some blocks (rectangular or square parts of the image) separately. Moreover, intra prediction may work on a block basis, possibly including partitioning to blocks of different sizes.

Embodiments of the video encoder 20 as shown in FIG. 14 may be further configured to partition and/or encode the picture by using slices (also referred to as video slices), wherein a picture may be partitioned into or encoded using one or more slices (typically non-overlapping), and each slice may comprise one or more blocks. Slices are parts of the image which are not predicted using other slices of the same picture.

Embodiments of the video encoder 20 as shown in FIG. 14 may be further configured to partition and/or encode the picture by using tile groups (also referred to as video tile groups) and/or tiles (also referred to as video tiles), wherein a picture may be partitioned into or encoded using one or more tile groups (typically non-overlapping), and each tile group may comprise, e.g. one or more blocks or one or more tiles, wherein each tile, e.g. may be of rectangular shape and may comprise one or more blocks (e.g. CTUs), e.g. complete or fractional blocks which may be coded in parallel.

The residual calculation unit 204 may be configured to calculate a residual block 205 (also referred to as residual 205) based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

The transform processing unit 206 may be configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain. The present disclosure may also apply other transformation which may be content-adaptive such as KLT, or the like.

The transform processing unit 206 may be configured to apply integer approximations of DCT/DST, such as the transforms specified for H.265/HEVC. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operations, bit depth of the transform coefficients, tradeoff between accuracy and implementation costs, etc. Specific scaling factors are, for example, specified for the inverse transform, e.g. by inverse transform processing unit 212 (and the corresponding inverse transform, e.g. by inverse transform processing unit 312 at video decoder 30) and corresponding scaling factors for the forward transform, e.g. by transform processing unit 206, at an encoder 20 may be specified accordingly.

Embodiments of the video encoder 20 (respectively transform processing unit 206) may be configured to output transform parameters, e.g. a type of transform or transforms, e.g. directly or encoded or compressed via the entropy encoding unit 270, so that, e.g., the video decoder 30 may receive and use the transform parameters for decoding.

The quantization unit 208 may be configured to quantize the transform coefficients 207 to obtain quantized coefficients 209, e.g. by applying scalar quantization or vector quantization. The quantized coefficients 209 may also be referred to as quantized transform coefficients 209 or quantized residual coefficients 209.

The quantization process may reduce the bit depth associated with some or all of the transform coefficients 207. For example, an n-bit transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a quantization parameter (QP). The quantization parameter may for example be an index to a predefined set of applicable quantization step sizes. For example, small quantization parameters may correspond to fine quantization (small quantization step sizes) and large quantization parameters may correspond to coarse quantization (large quantization step sizes) or vice versa. The quantization may include division by a quantization step size and a corresponding and/or the inverse dequantization, e.g. by inverse quantization unit 210, may include multiplication by the quantization step size. Embodiments according to some standards, e.g. HEVC, may be configured to use a quantization parameter to determine the quantization step size. Generally, the quantization step size may be calculated based on a quantization parameter using a fixed point approximation of an equation including division. Additional scaling factors may be introduced for quantization and dequantization to restore the norm of the residual block, which might get modified because of the scaling used in the fixed point approximation of the equation for quantization step size and quantization parameter. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

A picture compression level is controlled by quantization parameter (QP) that may be fixed for the whole picture (e.g. by using a same quantization parameter value), or may have different quantization parameter values for different regions of the picture.

According to an embodiment, a video decoder is provided for decoding an image of an image video sequence, comprising: the apparatus for decoding a motion vector field for a picture, as discussed above with reference to FIG. 13, in the bitstream. The video decoder further comprises circuitry applying a motion compensation according to the provided motion vectors to predict the picture; a picture of a video sequence (moving picture), and circuitry for reconstructing the image based on the predicted image.

Figure 15:
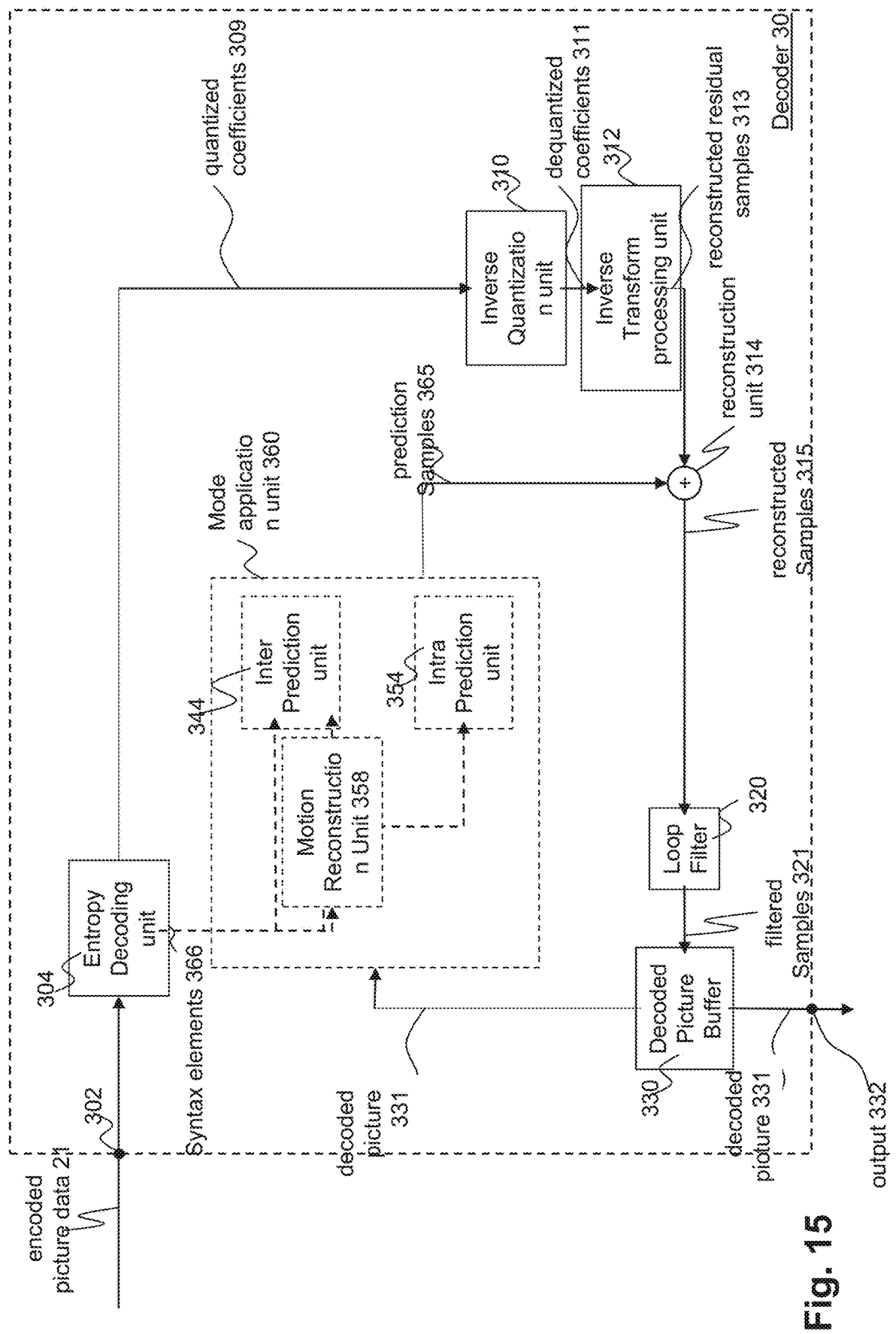
FIG. 15 is a block diagram illustrating an exemplary picture decoding apparatus which may implement some embodiments of the disclosure.

FIG. 15 illustrates an example of such embodiment of a decoder and the corresponding decoding method. In particular, a motion reconstruction unit 358 is added to the decoder 30, for performing the motion reconstruction based on the derived segments and motion vectors. In particular, FIG. 15 shows an example of a video decoder 30 that is configured to implement the techniques of this present application. The video decoder 30 is configured to receive encoded picture data 21 (e.g. encoded bitstream 21), e.g. encoded by encoder 20, to obtain a decoded picture 331. The encoded picture data or bitstream comprises information for decoding the encoded picture data, e.g. data that represents picture blocks of an encoded video slice (and/or tile groups or tiles) and associated syntax elements.

In the example of FIG. 15, the decoder 30 comprises an entropy decoding unit 304, an inverse quantization unit 310, an inverse transform processing unit 312, a reconstruction unit 314 (e.g. a summer 314), a loop filter 320, a decoded picture buffer (DBP) 330, a mode application unit 360, an inter prediction unit 344 and an intra prediction unit 354. Inter prediction unit 344 may be or include a motion compensation unit. Video decoder 30 may, in some examples, perform a decoding pass generally reciprocal to the encoding pass described with respect to video encoder 100 from FIG. 14.

As explained with regard to the encoder 20, the inverse quantization unit 210, the inverse transform processing unit 212, the reconstruction unit 214 the loop filter 220, the decoded picture buffer (DPB) 230, the inter prediction unit 344 and the intra prediction unit 354 are also referred to as forming the "built-in decoder" of video encoder 20. Accordingly, the inverse quantization unit 310 may be identical in function to the inverse quantization unit 110, the inverse transform processing unit 312 may be identical in function to the inverse transform processing unit 212, the reconstruction unit 314 may be identical in function to reconstruction unit 214, the loop filter 320 may be identical in function to the loop filter 220, and the decoded picture buffer 330 may be identical in function to the decoded picture buffer 230. Therefore, the explanations provided for the respective units and functions of the video 20 encoder apply correspondingly to the respective units and functions of the video decoder 30.

The entropy decoding unit 304 is configured to parse the bitstream 21 (or in general encoded picture data 21) and perform, for example, entropy decoding to the encoded picture data 21 to obtain, e.g., quantized coefficients 309 and/or decoded coding parameters (not shown in FIG. 15), e.g. any or all of inter prediction parameters (e.g. reference picture index and motion vectors or further parameters such as the interpolation information), intra prediction parameter (e.g. intra prediction mode or index), transform parameters, quantization parameters, loop filter parameters, and/or other syntax elements. Entropy decoding unit 304 maybe configured to apply the decoding algorithms or schemes corresponding to the encoding schemes as described with regard to the entropy encoding unit 270 of the encoder 20. Entropy decoding unit 304 may be further configured to provide inter prediction parameters, intra prediction parameter and/or other syntax elements to the mode application unit 360 and other parameters to other units of the decoder 30. Video decoder 30 may receive the syntax elements at the video slice level and/or the video block level. In addition or as an alternative to slices and respective syntax elements, tile groups and/or tiles and respective syntax elements may be received and/or used.

The inverse quantization unit 310 may be configured to receive quantization parameters (QP) (or in general information related to the inverse quantization) and quantized coefficients from the encoded picture data 21 (e.g. by parsing and/or decoding, e.g. by entropy decoding unit 304) and to apply based on the quantization parameters an inverse quantization on the decoded quantized coefficients 309 to obtain dequantized coefficients 311, which may also be referred to as transform coefficients 311. The inverse quantization process may include use of a quantization parameter determined by video encoder 20 for each video block in the video slice (or tile or tile group) to determine a degree of quantization and, likewise, a degree of inverse quantization that should be applied.

Inverse transform processing unit 312 may be configured to receive dequantized coefficients 311, also referred to as transform coefficients 311, and to apply a transform to the dequantized coefficients 311 in order to obtain reconstructed residual blocks 213 in the sample domain. The reconstructed residual blocks 213 may also be referred to as transform blocks 313. The transform may be an inverse transform, e.g., an inverse DCT, an inverse DST, an inverse integer transform, or a conceptually similar inverse transform process. The inverse transform processing unit 312 may be further configured to receive transform parameters or corresponding information from the encoded picture data 21 (e.g. by parsing and/or decoding, e.g. by entropy decoding unit 304) to determine the transform to be applied to the dequantized coefficients 311.

The reconstruction unit 314 (e.g. adder or summer 314) may be configured to add the reconstructed residual block 313, to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. The loop filter unit 320 may comprise one or more loop filters such as a de-blocking filter, a sample-adaptive offset (SAO) filter or one or more other filters, e.g. a bilateral filter, an adaptive loop filter (ALF), a sharpening, a smoothing filters or a collaborative filters, or any combination thereof. Although the loop filter unit 320 is shown in FIG. 15 as being an in loop filter, in other configurations, the loop filter unit 320 may be implemented as a post loop filter.

The decoded video blocks 321 of a picture are then stored in decoded picture buffer 330, which stores the decoded pictures 331 as reference pictures for subsequent motion compensation for other pictures and/or for output respectively display.

The decoder 30 is configured to output the decoded picture 311, e.g. via output 312, for presentation or viewing to a user.

The inter prediction unit 344 may be identical to the inter prediction unit 244 and the intra prediction unit 354 may be identical to the intra prediction unit 254 in function. The intra prediction unit 254 may perform split or partitioning of the picture and prediction based on the partitioning and/or prediction parameters or respective information received from the encoded picture data 21 (e.g. by parsing and/or decoding, e.g. by entropy decoding unit 304). Inter-prediction relies on the prediction obtained by reconstructing the motion vector field by the unit 358, based on the (e.g. also entropy decoded) interpolation information. Mode application unit 360 may be configured to perform the prediction (intra or inter prediction) per block based on reconstructed pictures, blocks or respective samples (filtered or unfiltered) to obtain the prediction block 365.

When the video slice is coded as an intra coded (I) slice, intra prediction unit 354 of mode application unit 360 is configured to generate prediction block 365 for a picture block of the current video slice based on a signaled intra prediction mode and data from previously decoded blocks of the current picture. When the video picture is coded as an inter coded (i.e., B, or P) slice, inter prediction unit 344 (e.g. motion compensation unit) of mode application unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Mode application unit 360 is configured to determine the prediction information for a video block of the current video slice by parsing the motion vectors or related information and other syntax elements, and uses the prediction information to produce the prediction blocks for the current video block being decoded. For example, the mode application unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each determined sample position associated with a motion vector and located in the slice, and other information to decode the video blocks in the current video slice. The same or similar may be applied for or by embodiments using tile groups (e.g. video tile groups) and/or tiles (e.g. video tiles) in addition or alternatively to slices (e.g. video slices), e.g. a video may be coded using I, P or B tile groups and/or tiles.

Other variations of the video decoder 30 can be used to decode the encoded picture data 21. For example, the decoder 30 can produce the output video stream without the loop filtering unit 320. For example, a non-transform based decoder 30 can inverse-quantize the residual signal directly without the inverse-transform processing unit 312 for certain blocks or frames. In another implementation, the video decoder 30 can have the inverse-quantization unit 310 and the inverse-transform processing unit 312 combined into a single unit.

It should be understood that, in the encoder 20 and the decoder 30, a processing result of a current step may be further processed and then output to the next step. For example, after interpolation filtering, motion vector derivation or loop filtering, a further operation, such as Clip or shift, may be performed on the processing result of the interpolation filtering, motion vector derivation or loop filtering.

Figure 16:
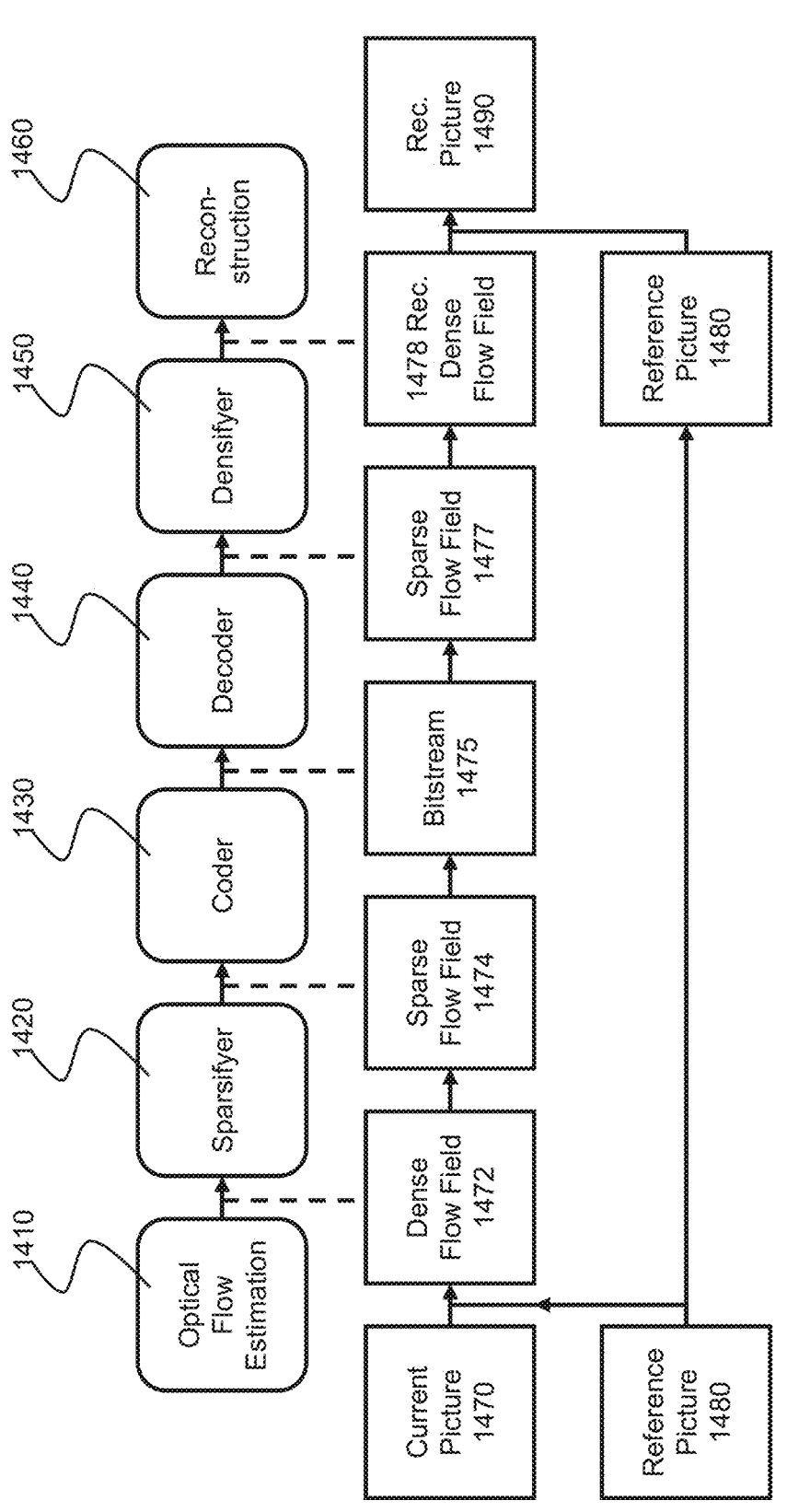
FIG. 16 is a block diagram illustrating a functional architecture of a motion vector encoding and decoding system in which some embodiments may be employed.

Moreover, the motion compensation employing the derivation of the sample positions as described above may be employed in a encoding and decoding chain illustrated in FIG. 16.

The encoding chain includes optical flow estimation 1410, which has as an input the current picture 1470 and the reference picture 1480. The optical flow estimation 1410 produces a dense flow field 1472, which is further processed by sparsifyer 1420 producing a sparse flow field 1474. The sparse flow field 1474 is entered to an encoder 1430 to generate bitstream 1475 (including the sparse motion field and possibly also the interpolation information). The bitstream 1475 is decoded by a decoder 1440 including derivation of the sparse flow field 1477 which enters a densifier (possibly with the interpolation information) 1450 resulting in a reconstructed dense flow field 1478. The reconstructed dense flow field 1478 is used together with the reference picture 1480 to generate reconstructed picture 1490 at the reconstruction stage 1460.

Figure 17:
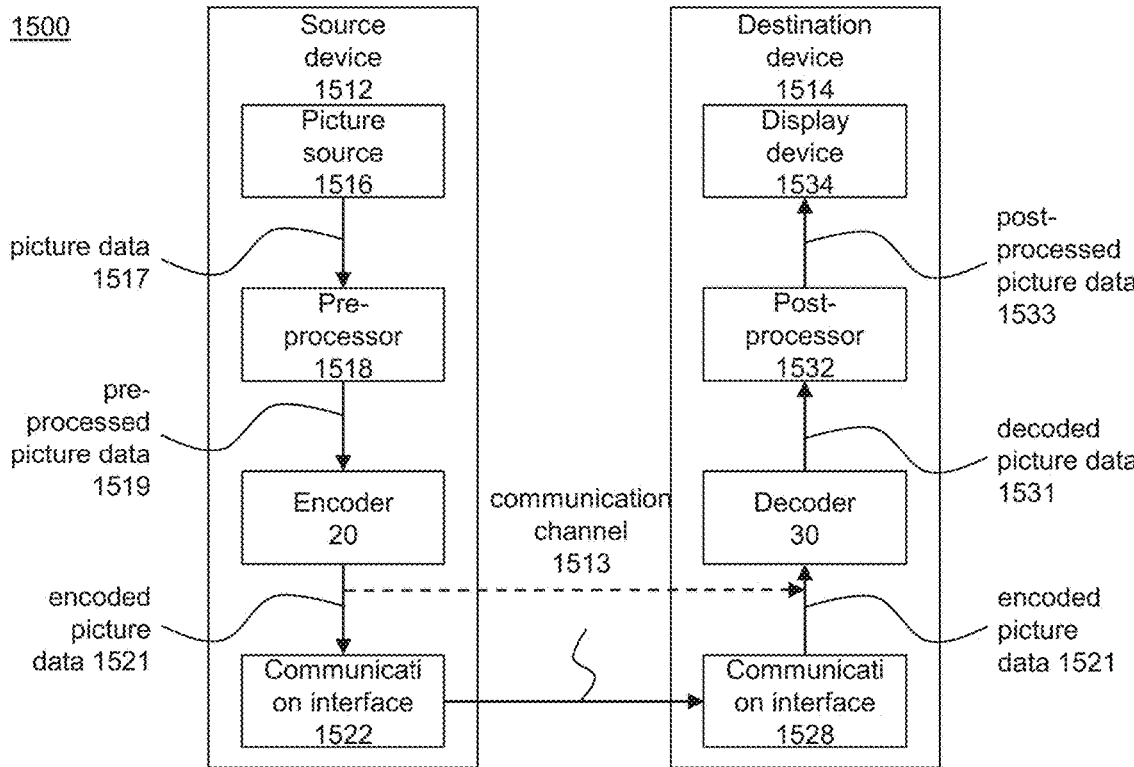
FIG. 17 is a block diagram showing an example of a video coding system configured to implement some embodiments.

The corresponding system which may deploy the above-mentioned encoder-decoder processing chain is illustrated in FIG. 17. FIG. 17 is a schematic block diagram illustrating an example coding system 1500, e.g. a video coding system 1500 (or short coding system 1500) that may utilize techniques of this present application. Video encoder 20 (or short encoder 20) and video decoder 30 (or short decoder 30) of video coding system 1510 represent examples of devices that may be configured to perform techniques in accordance with various examples described in the present application.

As shown in FIG. 17, the coding system 1510 comprises a source device 1512 configured to provide encoded picture data 1521 e.g. to a destination device 1514 for decoding the encoded picture data 1513.

The source device 1512 comprises an encoder 20, and may additionally, i.e. optionally, comprise a picture source 1516, a pre-processor (or pre-processing unit) 1518, e.g. a picture pre-processor 1518, and a communication interface or communication unit 1522.

The picture source 1516 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 1518 and the processing performed by the pre-processing unit 18, the picture or picture data 1517 may also be referred to as raw picture or raw picture data 1517.

Pre-processor 1518 is configured to receive the (raw) picture data 1517 and to perform pre-processing on the picture data 1517 to obtain a pre-processed picture 1519 or pre-processed picture data 1519. Pre-processing performed by the pre-processor 1518 may, e.g., comprise trimming, color format conversion (e.g. from RGB to YCbCr), color correction, or de-noising. It can be understood that the pre-processing unit 1518 may be optional component.

The video encoder 20 is configured to receive the pre-processed picture data 1519 and provide encoded picture data 1521 (e.g., based on FIG. 14).

Communication interface 1522 of the source device 1512 may be configured to receive the encoded picture data 1521 and to transmit the encoded picture data 1521 (or any further processed version thereof) over communication channel 1513 to another device, e.g. the destination device 1514 or any other device, for storage or direct reconstruction.

The destination device 1514 comprises a decoder 30 (e.g. a video decoder 30), and may additionally, i.e. optionally, comprise a communication interface or communication unit 1528, a post-processor 1532 (or post-processing unit 1532) and a display device 1534.

The communication interface 1528 of the destination device 1514 is configured receive the encoded picture data 1521 (or any further processed version thereof), e.g. directly from the source device 1512 or from any other source, e.g. a storage device, e.g. an encoded picture data storage device, and provide the encoded picture data 1521 to the decoder 30.

The communication interface 1522 and the communication interface 1528 may be configured to transmit or receive the encoded picture data 1521 or encoded data 1513 via a direct communication link between the source device 1512 and the destination device 1514, e.g. a direct wired or wireless connection, or via any kind of network, e.g. a wired or wireless network or any combination thereof, or any kind of private and public network, or any kind of combination thereof.

The communication interface 1522 may be, e.g., configured to package the encoded picture data 1521 into an appropriate format, e.g. packets, and/or process the encoded picture data using any kind of transmission encoding or processing for transmission over a communication link or communication network.

The communication interface 1528, forming the counterpart of the communication interface 1522, may be, e.g., configured to receive the transmitted data and process the transmission data using any kind of corresponding transmission decoding or processing and/or de-packaging to obtain the encoded picture data 1521.

Both, communication interface 1522 and communication interface 1528 may be configured as unidirectional communication interfaces as indicated by the arrow for the communication channel 1513 in FIG. 17 pointing from the source device 1512 to the destination device 1514, or bi-directional communication interfaces, and may be configured, e.g. to send and receive messages, e.g. to set up a connection, to acknowledge and exchange any other information related to the communication link and/or data transmission, e.g. encoded picture data transmission. The decoder 30 is configured to receive the encoded picture data 1521 and provide decoded picture data 1531 or a decoded picture 31 (e.g., based on FIG. 15).

The post-processor 1532 of destination device 1514 is configured to post-process the decoded picture data 1531 (also called reconstructed picture data), e.g. the decoded picture 1531, to obtain post-processed picture data 1533, e.g. a post-processed picture 1533. The post-processing performed by the post-processing unit 1532 may comprise, e.g. color format conversion (e.g. from YCbCr to RGB), color correction, trimming, or re-sampling, or any other processing, e.g. for preparing the decoded picture data 1531 for display, e.g. by display device 1534.

The display device 1534 of the destination device 1514 is configured to receive the post-processed picture data 1533 for displaying the picture, e.g. to a user or viewer. The display device 1534 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 17 depicts the source device 1512 and the destination device 1514 as separate devices, embodiments of devices may also comprise both or both functionalities, the source device 1512 or corresponding functionality and the destination device 1514 or corresponding functionality. In such embodiments the source device 1512 or corresponding functionality and the destination device 1514 or corresponding functionality may be implemented using the same hardware and/or software or by separate hardware and/or software or any combination thereof.

As will be apparent for the skilled person based on the description, the existence and (exact) split of functionalities of the different units or functionalities within the source device 1512 and/or destination device 1514 as shown in FIG. 17 may vary depending on the actual device and application.

Figure 18:
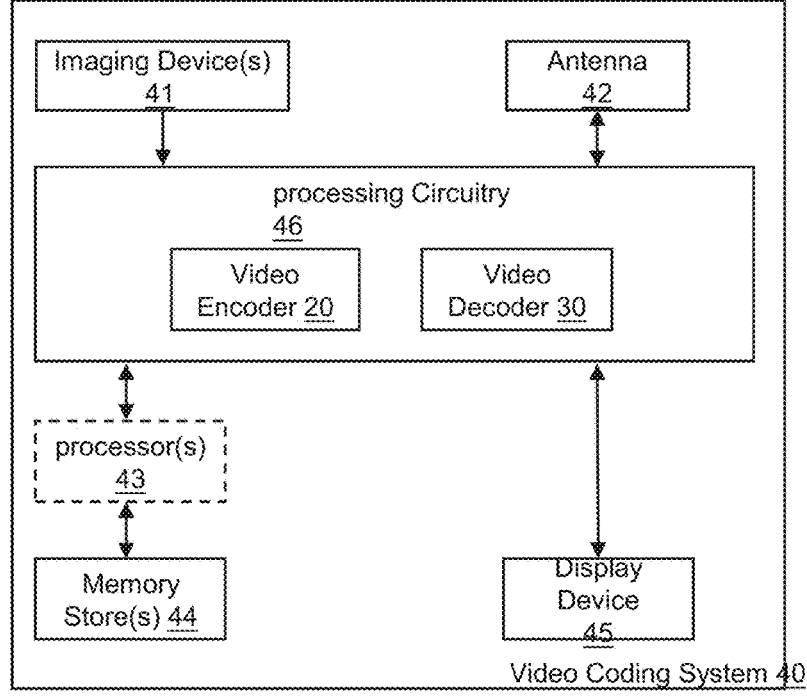
FIG. 18 is a block diagram showing another example of a video coding system configured to implement some embodiments.

The encoder 20 (e.g. a video encoder 20) or the decoder 30 (e.g. a video decoder 30) or both encoder 20 and decoder 30 may be implemented via processing circuitry as shown in FIG. 18, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules as discussed with respect to encoder 20 of FIG. 14 and/or any other encoder system or subsystem described herein. The decoder 30 may be implemented via processing circuitry 46 to embody the various modules as discussed with respect to decoder 30 of FIG. 15 and/or any other decoder system or subsystem described herein. The processing circuitry may be configured to perform the various operations as discussed later. If the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 18.

Source device 1512 and destination device 1514 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices(such as content services servers or content delivery servers), broadcast receiver device, broadcast transmitter device, or the like and may use no or any kind of operating system. In some cases, the source device 1512 and the destination device 1514 may be equipped for wireless communication. Thus, the source device 1512 and the destination device 1514 may be wireless communication devices.

In some cases, video coding system 1500 illustrated in FIG. 17 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

For convenience of description, embodiments of the disclosure are described herein, for example, by reference to High-Efficiency Video Coding (HEVC) or to the reference software of Versatile Video coding (VVC), the next generation video coding standard developed by the Joint Collaboration Team on Video Coding (JCT-VC) of ITU-T Video Coding Experts Group (VCEG) and ISO/IEC Motion Picture Experts Group (MPEG). One of ordinary skill in the art will understand that embodiments of the disclosure are not limited to HEVC or VVC but rather aimed at their next generations and/or any other codecs.

Figure 19:
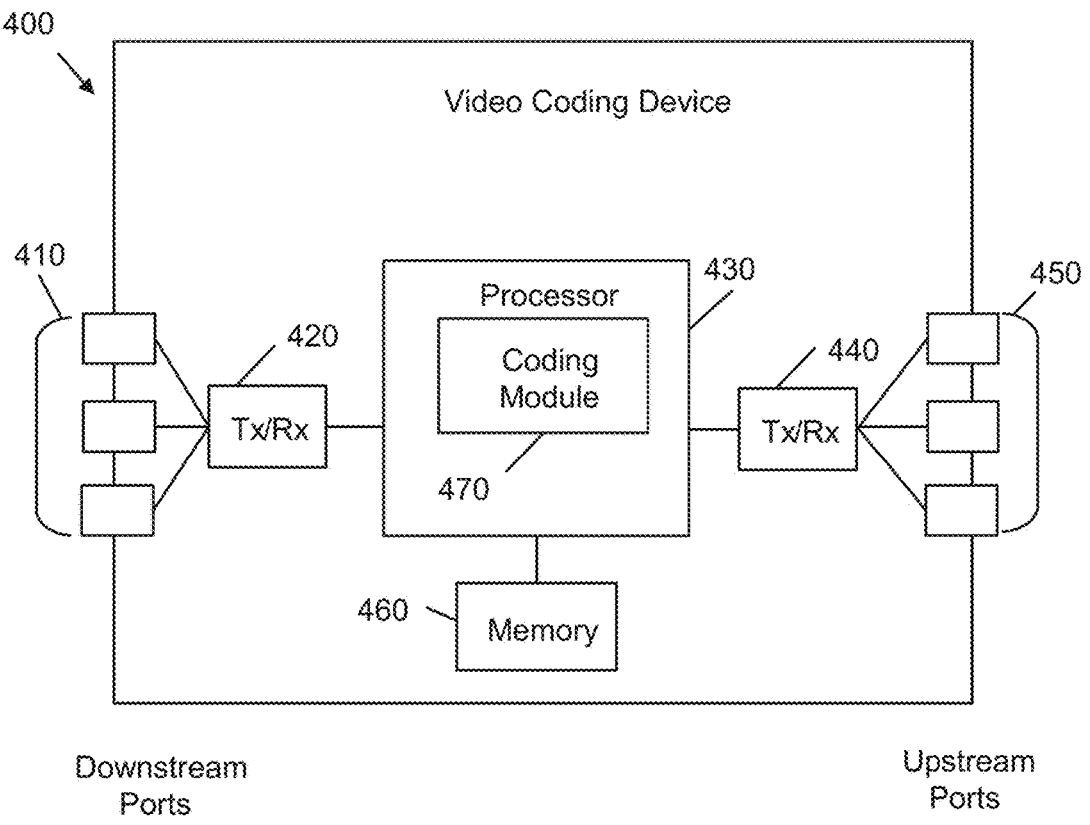
FIG. 19 is a block diagram illustrating an example of an encoding apparatus or a decoding apparatus.

FIG. 19 is a schematic diagram of a video coding device 400 according to an embodiment of the disclosure. The video coding device 400 is suitable for implementing the disclosed embodiments as described herein. In an embodiment, the video coding device 400 may be a decoder such as video decoder 30 of FIG. 17 or an encoder such as video encoder 20 of FIG. 17.

The video coding device 400 comprises ingress ports 410 (or input ports 410) and receiver units (Rx) 420 for receiving data; a processor, logic unit, or central processing unit (CPU) 430 to process the data; transmitter units (Tx) 440 and egress ports 450 (or output ports 450) for transmitting the data; and a memory 460 for storing the data. The video coding device 400 may also comprise optical-to-electrical (OE) components and electrical-to-optical (EO) components coupled to the ingress ports 410, the receiver units 420, the transmitter units 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, receiver units 420, transmitter units 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the video coding device 400 and effects a transformation of the video coding device 400 to a different state. Alternatively, the coding module 470 is implemented as instructions stored in the memory 460 and executed by the processor 430.

The memory 460 may comprise one or more disks, tape drives, and solid-state drives and may be used as an overflow data storage device, to store programs when such programs are selected for execution, and to store instructions and data that are read during program execution. The memory 460 may be, for example, volatile and/or non-volatile and may be a read-only memory (ROM), random access memory (RAM), ternary content-addressable memory (TCAM), and/or static random-access memory (SRAM).

Figure 20:
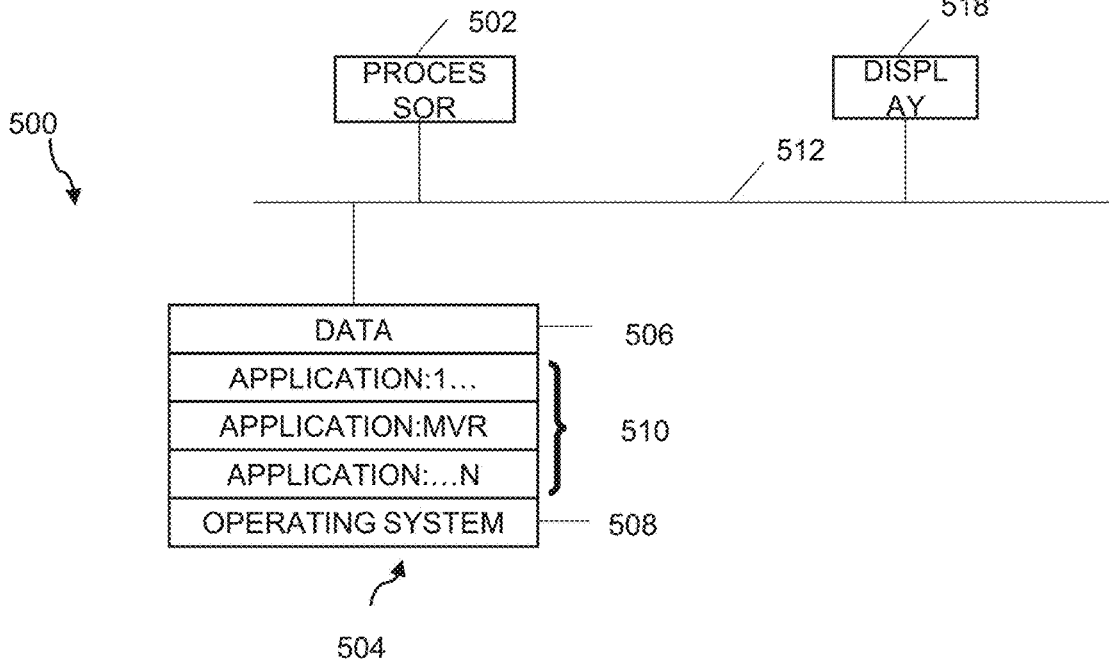
FIG. 20 is a block diagram illustrating another example of an encoding apparatus or a decoding apparatus.

FIG. 20 is a simplified block diagram of an apparatus 500 that may be used as either or both of the source device 1512 and the destination device 1514 from FIG. 17 according to an exemplary embodiment.

A processor 502 in the apparatus 500 can be a central processing unit. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a read only memory (ROM) device or a random access memory (RAM) device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512.

Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

Summarizing, the present disclosure relates to encoding a decoding of motion information. In order to exchange motion information between encoder and decoder, a sparse motion field is provided. In order to improve the reconstruction of the dense motion field, side information indicating a suitable interpolation approach for interpolating the motion vectors of the dense motion field different from the signaled sparse motion field motion vectors is provided. Such information is provided on a segment basis. The segments are derived at the encoder side and the decoder side similarly.

What is claimed is:

1. A method for reconstructing a motion vector field for a picture comprising a plurality of samples, the method comprising:

obtaining, based on a bitstream, two or more motion vectors, each of the two or more motion vectors specifying motion for a sample out of a first subset of the plurality of samples;

deriving a plurality of interpolation segments based on the obtained two or more motion vectors and one or more reference pictures to which the two or more motion vectors are related;

obtaining, from the bitstream, motion interpolation information indicating, for each of the plurality of interpolation segments, an interpolation approach for reconstructing motion in the segment, wherein the motion interpolation information indicates, for each of the plurality of interpolation segments, an interpolation approach out of at least two predefined interpolation approaches including a first interpolation approach and a second interpolation approach, and wherein the motion interpolation information is a binary flag indicating, for each of the plurality of interpolation segments, the interpolation approach to apply out of the first interpolation approach and the second interpolation approach; and for samples of an interpolation segment of the interpolation segments, reconstructing the motion vector field by applying the interpolation approach indicated by the motion interpolation information for the segment and using at least one of the two or more motion vectors, wherein the deriving of the plurality of interpolation segments comprises:

reconstructing a first motion field by applying the first interpolation approach on the two or more motion vectors;

reconstructing a second motion field by applying the second interpolation approach on the two or more motion vectors;

reconstructing a first intermediate picture using motion compensation with the first motion field;

reconstructing a second intermediate picture using motion compensation with the second motion field;

determining centers of the plurality of interpolation segments according to a first predetermined rule at least in areas of the picture for which the first intermediate picture and the second intermediate picture differ; and for each of the determined segment centers, determining samples of the picture which belong to the segment based on a second rule.

2. The method according to claim 1, wherein the at least two predefined interpolation approaches differ between each other and comprise nearest neighbor interpolation, bilinear interpolation, windowed sinc function based interpolation, and polynomial interpolation.

3. The method according to claim 1, wherein the degree of difference between the first intermediate picture and the second intermediate picture is calculated sample-wise based on a dissimilarity measure.

4. The method according to claim 1, wherein the determining of segment centers of the plurality of interpolation segments is performed according to the first predetermined rule in areas of the picture for which the first intermediate picture and the second intermediate picture differ by more than a predefined amount.

5. The method according to claim 1, wherein the first predetermined rule specifies a non-uniform sampling of samples of the picture, in which samples to be segment centers are picked pseudo-randomly with a predetermined seed, wherein the probability of picking a sample is proportional to the absolute difference between the first intermediate picture and the second intermediate picture.

6. The method according to claim 1, wherein the first predetermined rule includes:

generating pseudo-random noise samples and obtain a noised difference picture by multiplying the pseudo-random samples with the respective samples of a difference picture obtained as a difference between the first intermediate picture and the second intermediate picture; and selecting, as segment centers of the plurality of interpolation segments, samples of the noised difference picture which exceed a pre-determined threshold.

7. The method according to claim 1, wherein for each of the determined interpolation segment centers, the samples of the picture which belong to the segment are determined as Voronoi regions in a difference picture obtained as a difference between the first intermediate picture and the second intermediate picture; and the Voronoi regions are determined separately for areas of the difference picture with a positive sign and for areas of the difference picture with a negative sign.

8. The method according to claim 1, wherein no segment centers of the plurality of interpolation segments are determined in areas of the picture for which the first intermediate picture and the second intermediate picture meet a similarity criterion.

9. The method according to claim 1, wherein the motion interpolation information comprises for each of the plurality of interpolation segments a piece of motion interpolation information;

the association of pieces of the motion interpolation information with each respective interpolation segment out of the plurality of interpolation segments is given by:

ordering of the pieces of the motion interpolation information in the bitstream syntax; and a predetermined ordering of the determined plurality of interpolation segments.

10. The method according to claim 1, further comprising:

determining for each sample of the picture an interpolation approach according to the segment in which the sample is located, thereby obtaining a mask picture indicating in each mask picture sample the interpolation approach;

assigning to the mask picture samples that belong to no segment a default interpolation approach;

determining for each sample of the picture a motion vector by applying the interpolation approach specified by the corresponding sample of the mask picture.

11. The method according to claim 10, further comprising smoothing the mask picture before determining the motion vectors, wherein the smoothing is performed by Gaussian filtering or guided image filtering.

12. A method for encoding a motion vector field for a picture comprising a plurality of samples, the method comprising:

including, into a bitstream, two or more motion vectors, each of the two or more motion vectors specifying motion for a sample out of a first subset of the plurality of samples;

deriving a plurality of interpolation segments based on the two or more motion vectors and one or more reference pictures to which the two or more motion vectors are related;

encoding, into the bitstream, motion interpolation information indicating, for each of the plurality of interpolation segments, an interpolation approach for reconstructing motion in the segment, wherein the motion interpolation information indicates, for each of the plurality of interpolation segments, an interpolation approach out of at least two predefined interpolation approaches including a first interpolation approach and a second interpolation approach, and wherein the motion interpolation information is a binary flag indicating, for each of the plurality of interpolation segments, the interpolation approach to apply out of the first interpolation approach and the second interpolation approach; and for samples of an interpolation segment of the interpolation segments, determining the motion vector field by applying the interpolation approach indicated by the motion interpolation information for the interpolation segment and using at least one of the two or more motion vectors, wherein the deriving of the plurality of interpolation segments comprises:

reconstructing a first motion field by applying the first interpolation approach on the two or more motion vectors;

reconstructing a second motion field by applying the second interpolation approach on the two or more motion vectors;

reconstructing a first intermediate picture using motion compensation with the first motion field;

reconstructing a second intermediate picture using motion compensation with the second motion field;

determining centers of the plurality of interpolation segments according to a first predetermined rule at least in areas of the picture for which the first intermediate picture and the second intermediate picture differ; and for each of the determined segment centers, determining samples of the picture which belong to the segment based on a second rule.

13. The method according to claim 12, further comprising:

determining the two or more motion vectors by sparsification of a motion field by applying Delauney triangulation.

14. The method according to claim 12, further comprising:

selecting the interpolation approach for each of the plurality of interpolation segments according to a cost function including one or more out of rate, distortion, and complexity.

15. A non-transitory computer readable medium, comprising instructions, which, when executed on one or more processors, perform the steps of method 1.

16. An apparatus for reconstructing a motion vector field for a picture comprising a plurality of samples, the apparatus comprising a processing circuitry configured to:

obtain, based on a bitstream, two or more motion vectors, each of the two or more motion vectors specifying motion for a sample out of a first subset of the plurality of samples;

derive a plurality of interpolation segments based on the obtained two or more motion vectors and one or more reference pictures to which the two or more motion vectors are related;

obtain, from the bitstream, motion interpolation information indicating, for each of the plurality of interpolation segments, an interpolation approach for reconstructing motion in the segment, wherein the motion interpolation information indicates, for each of the plurality of interpolation segments, an interpolation approach out of at least two predefined interpolation approaches including a first interpolation approach and a second interpolation approach, and wherein the motion interpolation information is a binary flag indicating, for each of the plurality of interpolation segments, the interpolation approach to apply out of the first interpolation approach and the second interpolation approach; and for samples of an interpolation segment of the interpolation segments, reconstruct the motion vector field by applying the interpolation approach indicated by the motion interpolation information for the segment and using at least one of the two or more motion vectors, wherein the deriving of the plurality of interpolation segments comprises to:

reconstruct a first motion field by applying the first interpolation approach on the two or more motion vectors;

reconstruct a second motion field by applying the second interpolation approach on the two or more motion vectors;

reconstruct a first intermediate picture using motion compensation with the first motion field;

reconstruct a second intermediate picture using motion compensation with the second motion field;

determine centers of the plurality of interpolation segments according to a first predetermined rule at least in areas of the picture for which the first intermediate picture and the second intermediate picture differ; and for each of the determined segment centers, determine samples of the picture which belong to the segment based on a second rule.

17. An apparatus for encoding a motion vector field for a picture comprising a plurality of samples, the apparatus comprising a processing circuitry configured to:

include, into a bitstream, two or more motion vectors, each of the two or more motion vectors specifying motion for a sample out of a first subset of the plurality of samples;

derive a plurality of interpolation segments based on the two or more motion vectors and one or more reference pictures to which the two or more motion vectors are related;

encode, into the bitstream, motion interpolation information indicating, for each of the plurality of interpolation segments, an interpolation approach for reconstructing motion in the segment, wherein the motion interpolation information indicates, for each of the plurality of interpolation segments, an interpolation approach out of at least two predefined interpolation approaches including a first interpolation approach and a second interpolation approach, and wherein the motion interpolation information is a binary flag indicating, for each of the plurality of interpolation segments, the interpolation approach to apply out of the first interpolation approach and the second interpolation approach; and for samples of an interpolation segment of the interpolation segments, determine the motion vector field by applying the interpolation approach indicated by the motion interpolation information for the segment and using at least one of the two or more motion vectors, wherein the deriving of the plurality of interpolation segments comprises to:

reconstruct a first motion field by applying the first interpolation approach on the two or more motion vectors;

reconstruct a second motion field by applying the second interpolation approach on the two or more motion vectors;

reconstruct a first intermediate picture using motion compensation with the first motion field;

reconstruct a second intermediate picture using motion compensation with the second motion field;

determine centers of the plurality of interpolation segments according to a first predetermined rule at least in areas of the picture for which the first intermediate picture and the second intermediate picture differ; and for each of the determined segment centers, determine samples of the picture which belong to the segment based on a second rule.

* * * * *